United States Patent [19]
Arnold et al.

[11] Patent Number: 5,214,695
[45] Date of Patent: * May 25, 1993

[54] APPARATUS AND METHOD FOR LOADING A SYSTEM REFERENCE DISKETTE IMAGE FROM A SYSTEM PARTITION IN A PERSONAL COMPUTER SYSTEM

[75] Inventors: Lisa R. Arnold, Boynton Beach; Richard Bealkowski, Delray Beach; John W. Blackledge, Jr., Boca Raton; Doyle S. Cronk, Delray Beach; Richard A. Dayan; Douglas R. Geisler, both of Boca Raton; Matthew T. Mittelstedt, Delray Beach, all of Fla.; Matthew S. Palka, Jr., Raleigh, N.C.; John D. Paul, Boynton Beach, Fla.; Robert Sachsenmaier, Boca Raton, Fla.; Kenneth D. Smeltzer, Delray Beach, Fla.; Peter A. Woytovech, Boynton Beach, Fla.; Kevin M. Zyvoloski, Raleigh, N.C.

[73] Assignee: International Business Machines Corporation, Armonk, N.Y.

[ * ] Notice: The portion of the term of this patent subsequent to Jul. 7, 2009 has been disclaimed.

[21] Appl. No.: 716,594

[22] Filed: Jun. 17, 1991

Related U.S. Application Data

[63] Continuation-in-part of Ser. No. 557,334, Jul. 23, 1990, Pat. No. 5,128,995.

[51] Int. Cl.[5] .............................................. H04L 9/00
[52] U.S. Cl. .......................................... 380/4; 380/49; 380/50; 395/934; 395/725
[58] Field of Search ................... 380/4, 23, 25, 50, 49; 371/11.3; 395/425, 600, 725, 700, 934

[56] References Cited

U.S. PATENT DOCUMENTS

| | | | |
|---|---|---|---|
| 4,757,533 | 7/1988 | Allen et al. | 380/25 |
| 4,839,895 | 6/1989 | Makita | 371/11.3 |
| 4,937,861 | 6/1990 | Cummins | 380/4 X |
| 4,951,249 | 8/1990 | McClung et al. | 380/25 X |
| 5,022,077 | 6/1991 | Bealkowski et al. | 380/4 |
| 5,063,496 | 11/1991 | Dayan et al. | 395/700 |
| 5,128,995 | 7/1992 | Arnold et al. | 380/4 |

Primary Examiner—Tod R. Swann
Attorney, Agent, or Firm—Winfield J. Brown, Jr.; Stephen A. Terrile

[57] ABSTRACT

A personal computer system according to the present invention comprises a system processor, a random access memory, a read only memory, and at least one direct access storage device. A direct access storage device controller coupled between the system processor and direct access storage device includes a protection mechanism for protecting a region of the storage device. The protected region of the storage device includes a master boot record, a BIOS image and a system reference diskette image. The BIOS image includes a section known as Power on Self Test (POST). POST is used to test and initialize a system. Upon detecting any configuration error, system utilities from the system reference diskette image, such as set configuration programs, diagnostic programs and utility programs can be automatically activated from the direct access storage device.

10 Claims, 17 Drawing Sheets

APPARATUS AND METHOD FOR LOADING A SYSTEM REFERENCE DISKETTE IMAGE FROM A SYSTEM PARTITION IN A PERSONAL COMPUTER SYSTEM

CROSS REFERENCE TO RELATED PATENT APPLICATIONS

The present patent application is continuation-in-part of U.S. application Ser. No. 07/557,334, filed 07/23/90, now U.S. Pat. No. 5,128,995. U.S. Ser. No. 07/557,334 is one of a group of copending applications which concern the same overall personal computer system but which individually claim different inventive concepts embodied in such personal computer system. These related patent applications were filed on the same date, namely Aug. 25, 1989, are specifically incorporated by reference herein, and are more particularly described as follows:

(1) U.S. application having Ser. No 07/399,631, which is now abandoned. entitled "An Apparatus and Method for Loading BIOS from a Diskette in a Personal Computer System", the inventors being Bealkowski et al;

(2) U.S. patent application having Ser. No. 07/398,865, entitled "Initial BIOS Load for a Personal Computer System", the inventors being Bealkowski et al; and (3) U.S. patent application having Ser. No. 07/398,860, now U.S. Pat. No. 5,136,713 entitled "An Apparatus and Method for Decreasing the Memory Requirements for BIOS in a Personal Computer System", the inventors being Bealkowski et al.

(4) U.S. patent application having Ser. No. 07/398,820, which is now U.S. Pat. No. 5,022,077 entitled "An Apparatus and Method for Preventing Unauthorized Access to BIOS in a Personal Computer System", the inventors being Bealkowski et al.

FIELD OF THE INVENTION

This invention relates to personal computer systems and in particular to a method and device for protecting and storing system utilities in a protected partition on a mass storage device in a personal computer system.

BACKGROUND DISCUSSION

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's PERSONAL COMPUTER AT and IBM's PERSONAL SYSTEM/2 Models 25, 30, 50, 50Z, 55SX, 60, 65SX, 70 and 80.

These systems can be classified into two general families. The first family, usually referred to as Family I Models, use a bus architecture exemplified by the IBM PERSONAL COMPUTER AT. The second family, referred to as Family II Models, use IBM's Micro Channel bus architecture exemplified by IBM's PERSONAL SYSTEM/2 Models 50 through 80.

Beginning with the earliest personal computer system of the family I models, such as the IBM Personal Computer, it was recognized that software compatibility would be of utmost importance. In order to achieve this goal, an insulation layer of system resident code, also known as "firmware", was established between the hardware and software. This firmware provided an operational interface between a user's application program/operating system and the device to relieve the user of the concern about the characteristics of hardware devices. Eventually, the code developed into a BASIC input/output system (BIOS), for allowing new devices to be added to the system, while insulating the application program from the peculiarities of the hardware. The importance of BIOS was immediately evident because it freed a device driver from depending on specific device hardware characteristics while providing the device driver with an intermediate interface to the device. Since BIOS was an integral part of the system and controlled the movement of data in and out of the system processor, it was resident on the system planar and was shipped to the user in a read only memory (ROM). For example, BIOS in the original IBM Personal Computer occupied 8K of ROM resident on the planar board.

As new models of the personal computer family were introduced, BIOS had to be updated and expanded to include new hardware and I/O devices. As would be expected, BIOS started to increase in memory size. For example, with the introduction of the IBM PERSONAL COMPUTER AT, BIOS grew to require 32K bytes of ROM.

Today, with the development of new technology, personal computer systems of the Family II models are growing even more sophisticated and are being made available to consumers more frequently. Since the technology is rapidly changing and new I/O devices are being added to the personal computer systems, modification to the BIOS has become a significant problem in the development cycle of the personal computer system.

For instance, with the introduction of the IBM Personal System/2 with Micro Channel architecture, a significantly new BIOS, known as Advanced BIOS, or ABIOS, was developed. However, to maintain software compatibility, BIOS from the Family I models had to be included in the Family II models. The Family I BIOS became known as Compatibility BIOS or CBIOS. However, as previously explained with respect to the IBM PERSONAL COMPUTER AT, only 32K bytes of ROM were resident on the planar board. Fortunately, the system could be expanded to 96K bytes of ROM. Unfortunately, because of system constraints this turned out to be the maximum capacity available for BIOS. Luckily, even with the addition of ABIOS, ABIOS and CBIOS could still squeeze into 96K of ROM. However, only a small percentage of the 96K ROM area remained available for expansion. With the addition of future I/O devices, CBIOS and ABIOS will eventually run out of ROM space. Thus, new I/O technology will not be able to be easily integrated within CBIOS and ABIOS.

Due to these problems, plus the desire to make modifications in Family II BIOS as late as possible in the development cycle, it became necessary to off load portions of BOS from the ROM. This was accomplished by storing portions of BIOS on a mass storage device such as a fixed disk. Since a disk provides writing as well as reading capabilities, it became feasible to modify the actual BIOS code on the disk. The disk, while providing a fast and efficient way to store BIOS code, nevertheless greatly increased the probability of the BIOS code being corrupted. Since BIOS is an integral part of the operating system, a corrupt BIOS could lead to devastating results and in many cases to complete failure and non-operation of the system. Thus, it became quite apparent that a means for preventing unauthorized modification of the BIOS code on the fixed disk was highly desirable, this was the subject matter of U.S. application Ser. No. 07/398,820, filed Aug. 25, 1989.

In addition to the storing of BIOS on a mass storage device, storing of system utilities normally contained on a system reference diskette became highly desirable. The elimination of the system reference diskette not only reduces the price of the system, but provides a more user friendly environment.

It is appropriate at this time to briefly explain the purpose of the system utilities previously stored on the reference diskette. With the introduction of IBM's PS/2 Micro Channel Systems came the removal of switches and jumpers from I/O adapter cards and planar. Micro Channel Architecture provided for programmable registers to replace them. Utilities to configure these programmable registers or programmable option select (POS) registers were required. In addition, other utilities to improve system usability characteristics along with system diagnostics were shipped with each system on this system reference diskette.

Prior to initial use, each Micro Channel System required its POS registers to be initialized. For example, if the system is booted with a new I/O card, or a slot change for an I/O card, a configuration error is generated and the system boot up procedure halts. The user is then prompted to load the system reference diskette and press the F1 key. A "Set Configuration Utility" can then be booted from the system reference diskette to configure the system. The Set Configuration Utility will prompt the user for the desired action. If the appropriate I/O card's descriptor files are loaded on the system reference diskette, the Set Configuration Utility will generate the correct POS or configuration data in nonvolatile storage. The descriptor file contains configuration information such as priority and I.D., to interface the card to the system.

Although this procedure is fairly easy to perform, the system reference diskette must be handy or conveniently stored nearby. It has occurred, after some period of time has elapsed, that the system reference diskette has become misplaced. Therefore it has become highly desirable to store a copy of the system reference diskette on the mass storage device, along with BIOS, to improve the usability of the system.

SUMMARY OF THE INVENTION

The present invention has been developed for the purpose of solving the above mentioned problems. Accordingly, the invention has as one of its objects a means for storing an image of the system reference diskette on a direct access storage device in a personal computer system.

Another objective of the present invention is to improve the usability of these systems by providing each system its own personalized copy of the system reference diskette and configuration files.

Broadly considered, a personal computer system according to the present invention comprises a system processor, a random access memory, a read only memory, and at least one direct access storage device. A direct access storage device controller coupled between the system processor and direct access storage device includes a means for protecting a region of the storage device. The protected region of the storage device includes a master boot record, a BIOS image and the system reference diskette image. The BIOS image includes a section known as Power on Self Test (POST). POST is used to test and initialize a system. Upon detecting any configuration error, system utilities from the system reference diskette image, such as set configuration programs, diagnostic programs and utility programs can be automatically or manually activated.

In particular, in response to a reset signal to boot up the system, the protection means permits access to the protected region to allow the master boot record to be loaded into random access memory. In operation, the master boot record further loads the BIOS image into random access memory. BIOS, now in random access memory, is executed and boots up the operating system to begin operation of the system and BIOS then generates a second signal which activates the protection means to prevent access to the region on the disk containing the master boot record and the BIOS image. If BIOS (POST) detects an error, BIOS generates a third signal to disable the protection means and then tries to boot up a system reference diskette found in a bootable diskette drive. If there is no system reference diskette then BIOS boots up the system utilities in the system partition region.

In particular, the read only memory includes a first portion of BIOS. The first portion of BIOS initializes the system processor, the direct access storage device and resets the protection means to read the master boot record from the protected region or partition on the direct access storage device into the random access memory. The master boot record includes a data segment and an executable code segment. The data segment includes data representing system hardware and a system configuration which is supported by the master boot record. The first BIOS portion confirms the master boot record is compatible with the system hardware by verifying the data from the data segment of the master boot record agrees with data included within the first BIOS portion representing the system processor, system planar, and planar I/O configuration.

If the master boot record is compatible with the system hardware, the first BIOS portion vectors the system processor to execute the executable code segment of the master boot record. The executable code segment confirms that the system configuration has not changed and loads in the remaining BIOS portion from the direct access storage device into random access memory. The executable code segment then verifies the authenticity of the remaining BIOS portion, vectors the system processor to begin executing the BIOS now in random access memory. BIOS, executing in random access memory, generates the second signal for protecting the disk partition having the remaining BIOS and then boots up the operating system to begin operation of the personal computer system. The partition holding the remaining BIOS is protected to prevent access to the BIOS code on disk in order to protect the integrity of the BIOS code.

However, if either an error or a user initiated diagnostic boot key sequence is detected by BIOS prior to booting the operating system, the system reference diskette image, if present, will be booted from the system partition. In addition, if a system reference diskette is detected in diskette drive A, the system reference diskette will take precedence over the image in the system partition and will be booted instead. In these situations, BIOS will ensure that the protection means are inactive prior to the Bootstrap Loader turning control over the boot record. Thus, the protection means to prevent access to the region on the disk containing the master boot record, the BIOS image and the system reference diskette image will not be active. BIOS then will boot up the system reference diskette image or the system reference diskette with the region on the disk open to access by software.

BRIEF DESCRIPTION OF THE DRAWINGS

The foreground aspects and other features of the present invention are explained in the following written description, taken in connection with the accompanying drawings, wherein:

FIGS. 11, 11a and 11b is a flowchart describing the process for deciding when to load the system reference diskette image from a direct access storage device;

DESCRIPTION OF A PREFERRED EMBODIMENT

The following detailed description is of the best presently contemplated mode for carrying out the invention. This description is not to be taken in a limiting sense but is made merely for the purpose of illustrating the general principles of the invention since the scope of the invention is best defined by the appending claims.

Figure 1:
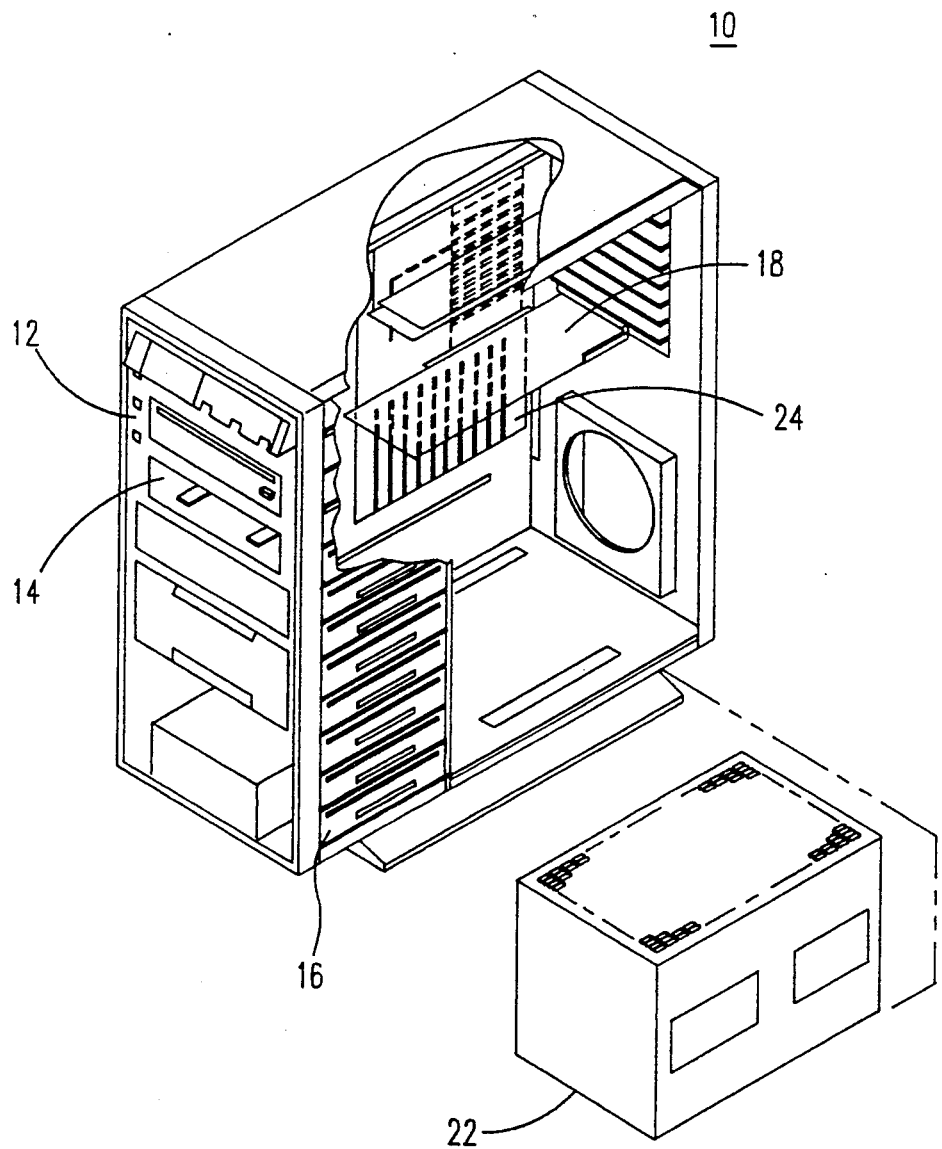
FIG. 1 illustrates a cut away view of a personal computer system showing a system planar board connected to a plurality of direct access storage devices.

Referring now to the drawings, and in particular to FIG. 1, there is shown a cutaway version of a personal computer system 10, having a plurality of DASD (Direct Access Storage Devices) 12 -16 connected to a system or planar board 24 through a plurality of I/O slots 18. A power supply 22 provides electrical power to the system 10 in a manner well known. The planar board 24 includes a system processor which operates under the control of computer instructions to input, process, and output information.

In use, the personal computer system 10 is designed primarily to give independent computing power to a small group of users or a single user and is inexpensively priced for purchase by individuals or small businesses. In operation, the system processor operates under an operating system, such as IBM's OS/2 Operating System or DOS. This type of operating system includes a BIOS interface between the DASD 12-16 and the Operating System. A portion of BIOS divided into modules by function is stored in ROM on the planar 24 and hereinafter will be referred to as ROM-BIOS. BIOS provides an interface between the hardware and the operating system software to enable a programmer or user to program their machines without an in depth operating knowledge of a particular device. For example, a BIOS diskette module permits a programmer to program the diskette drive without an in depth knowledge of the diskette drive hardware. Thus, a number of diskette drives designed and manufactured by different companies can be used in the system. This not only lowers the cost of the system 10, but permits a user to choose from a number of diskette drives.

Figure 2:
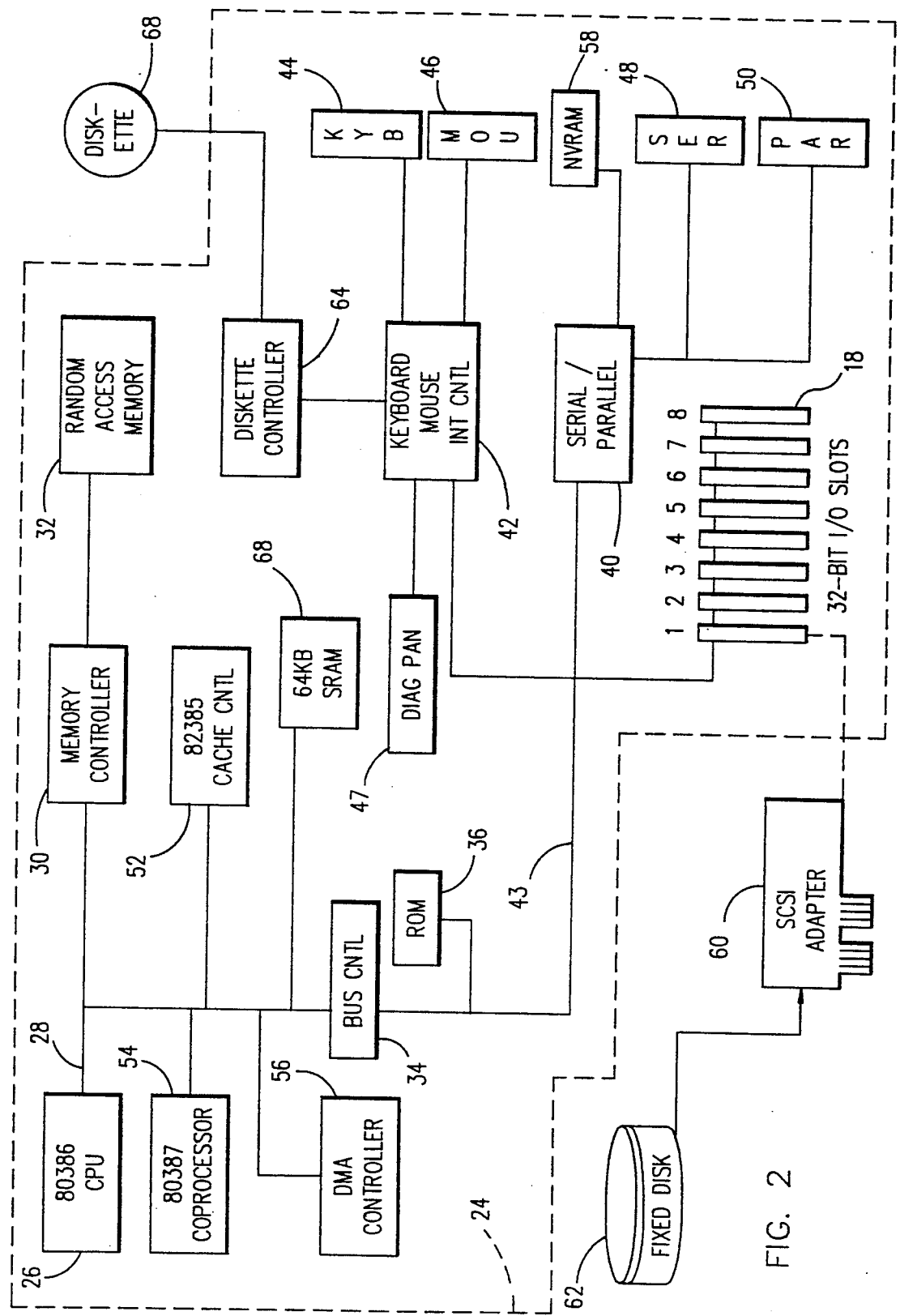
FIG. 2 shows a system block diagram for the personal computer system of FIG. 1.

Prior to relating the above structure to the present invention, a summary of the operation in general of the personal computer system 10 may merit review. Referring to FIG. 2, there is shown a block diagram of the personal computer system 10. FIG. 2 illustrates components of the planar 24 and the connection of the planar 24 to the I/O slots 18 and other hardware of the personal computer system. Located on the planar 24 is the system processor 26 comprised of a microprocessor which is connected by a local bus 28 to a memory controller 30 which is further connected to a random access memory (RAM) 32. While any appropriate microprocessor can be used, one suitable microprocessor is the 80386 which is sold by Intel.

While the present invention is described hereinafter with particular reference to the system block diagram of FIG. 2, it is to be understood at the outset of the description which follows, it is contemplated that the apparatus and methods in accordance with the present invention may be used with other hardware configurations of the planar board. For example, the system processor could be an Intel 80286 or 80486 microprocessor.

Accessible by the processor is a planar identification number (planar ID). The planar ID is unique to the planar and identifies the type of planar being used. For example, the planar ID can be hardwired to be read through an I/O port of the system processor 26 or by using switches. Additionally, another I/O port of the system processor 26 can be used to generate a reset signal using planar logic circuitry to the disk controller. For instance, the reset signal can be initiated by software addressing the I/O port and activating planar logic to generate the reset signal.

The local bus 28 is further connected through a bus controller 34 to a read only memory (ROM) 36 on the planar 24. An additional nonvolatile memory (NVRAM) 58 is connected to the microprocessor 26 through a serial/parallel port interface 40 which is further connected to bus controller 34. The nonvolatile memory can be CMOS with battery backup to retain information whenever power is removed from the system. Since the ROM is normally resident on the planar, model and submodel values stored in ROM are used to identify the system processor and the system planar I/O configuration respectively. Thus these values will physically identify the processor and planar I/O configuration.

The NVRAM is used to store system configuration data. That is, the NVRAM will contain values which describe the present configuration of the system. For example, NVRAM contains information describing the capacity of a fixed disk or diskette, the type of display, the amount of memory, time, date, etc. Additionally, the model and submodel values stored in ROM are copied to NVRAM whenever a special configuration program, such as Set Configuration, is executed. The purpose of the Set Configuration program is to store values characterizing the configuration of the system in NVRAM. Thus for a system that is configured properly, the model and submodel values in NVRAM will be equal respectively to the model and submodel values stored in ROM. If these values are not equal, this indicates that the configuration of the system has been modified. Reference is made to FIG. 6D, where this feature in combination with loading BIOS is explained in greater detail.

Continuing, our discussion with reference to FIG. 2, the bus controller 34 is further coupled to I/O slots 18, the serial/parallel interface 40 and peripheral controller 42 by an I/O planar bus 43. The peripheral controller 42 is further connected to a keyboard 44, mouse 46, diagnostic panel 47, and diskette controller 64. Beside the NVRAM 58, the serial/parallel interface 40 is further connected to a serial port 48 and parallel port 50 to input/output information to a printer, hard copy device, etc. As is well known in the art, the local bus 28 can also be connected to a cache controller 52, a cache memory 68, a co-processor 54, and a DMA controller 56.

The system processor 26 controls its internal operation as well as interfacing with other elements of the personal computer system 10. For example, system processor 26 is shown connected to a small computer system interface (SCSI) I/O card 60 which is further connected to a DASD, such as a fixed disk drive 62. It is to be understood that other than a SCSI disk drive can be used as a fixed disk in accordance with the present invention. In addition to the fixed disk 62, the system processor 26 can be interfaced to the diskette controller 64 which controls a diskette drive 66. With respect to terminology, it is also to be understood that the term "hardfile" describes fixed disk drive 62 while the term "floppy" also describes diskette drive 66.

Previous to the present invention, ROM 36 could include all of the BIOS code which interfaced the operating system to the hardware peripherals. According to one aspect of the present invention, however, ROM 36 is adapted to store only a portion of BIOS. This portion, when executed by the system processor 26, inputs from either the fixed disk 62 or diskette 66 a second or remaining portion of BIOS, hereinafter also referred to as a BIOS image. An image is a fully processed unit of data that is ready to be transmitted to the system processor 26; when loaded into main memory 32, the execution of the image determines the operations of the personal computer system 10.

This BIOS image supersedes the first BIOS portion and being an integral part of the system is resident in main memory such as RAM 32. The first portion of BIOS (ROM-BIOS) as stored in ROM 36 will be explained generally with respect to FIGS. 3-4 and in detail with respect to FIGS. 6A-D. The second portion of BIOS (BIOS image) will be explained with respect to FIG. 5, and the loading of the BIOS image with respect to FIG. 7. Another benefit from loading a BIOS image from a DASD is the ability to load BIOS directly into the system processor's RAM 32. Since accessing RAM is much faster than accessing ROM, a significant improvement in the processing speed of the computer system is achieved. An additional advantage is also gained by storing system utilities on the DASD. When a condition for the usage of the system utilities is required, the system utility can automatically be referenced on the DASD.

The explanation will now proceed to the operation of the BIOS in ROM 36 and to the operation of loading the BIOS image and system reference diskette image from either the fixed disk or diskette. In general, a first program such as ROM-BIOS prechecks the system and loads a master boot record into RAM. The master boot record includes a data segment having validation information and, being a loading means, a code segment having executable code. The executable code uses the data information to validate hardware compatibility and system configuration. After testing for hardware compatibility and proper system configuration, the executable code loads the BIOS image into RAM producing a main memory resident program. The BIOS image succeeds ROM-BIOS and loads the operating system to begin operation of the machine. For purposes of clarity, the executable code segment of the master boot record will be referred to as MBR code while the data segment will be referred to as MBR data.

Figure 3:
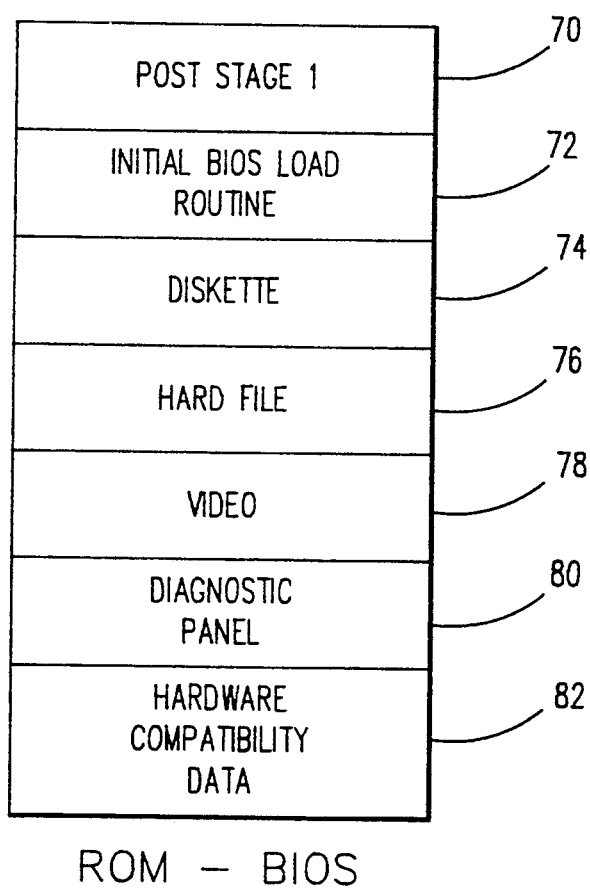
FIG. 3 is a memory map for the ROM BIOS included on the planar board.

Referring to FIG. 3 there is a memory map showing the different code modules which comprise ROM-BIOS. ROM-BIOS includes a power on self test (POST) stage I module 70, an Initial BIOS Load (IBL) Routine module 72, a Diskette module 74, a hardfile module 76, a video module 78, a diagnostic-panel module 80, and hardware compatibility data 82. Briefly, POST Stage I 70 performs system pre-initialization and tests. The IBL routine 72 determines whether the BIOS image is to be loaded from disk or diskette, checks compatibility and loads the master boot record. Diskette module 74 provides input/output functions for a diskette drive. Hardfile module 76 controls I/O to a fixed disk or the like. Video module 78 controls output functions to a video I/O controller which is further connected to a video display. Diagnostic panel module 80 provides control to a diagnostic display device for the system. The hardware compatibility data 82 includes such values as a system model and submodel values which are described later with respect to FIG. 5.

Figure 4:
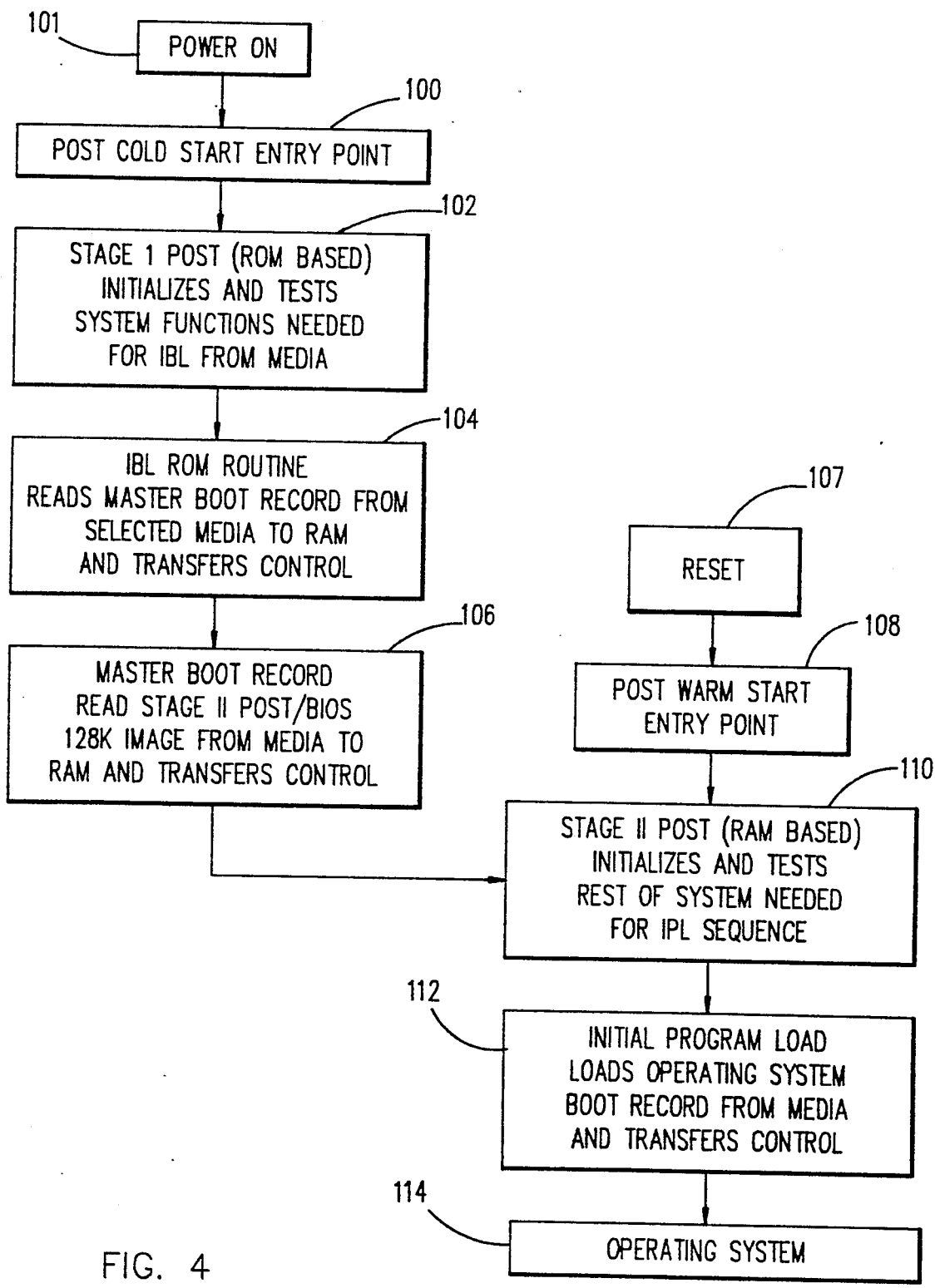
FIG. 4 is a flowchart describing the overall process for loading a BIOS image from a direct access storage device.

Referring now to FIG. 4, there is shown a process overview for loading a BIOS image into the system from either the fixed disk or the diskette. When the system is powered up, the system processor the is vectored to entry point of POST Stage I, step 100. POST Stage I initializes the system and tests only those system functions needed to load BIOS image from the selected DASD, step 102. In particular, POST Stage I initializes the processor/planar functions, diagnostic panel, memory subsystem, interrupt controllers, timers, DMA subsystem, fixed disk BIOS routine (Hardfile module 76), and diskette BIOS routine (Diskette module 74), if necessary.

After POST Stage I pre-initializes the system, POST Stage I vectors the system processor to the Initial BIOS Load (IBL) routine included in the Initial BIOS Load module 72. The IBL routine first, determines whether the BIOS image is store on fixed disk or can be loaded from diskette; and second, loads the master boot record from the selected media (either disk or diskette) into RAM, step 104. The master boot record includes the MBR data and the MBR code. The MBR data is used for verification purposes and the MBR code is executed to load in the BIOS image. A detailed description of the operation of the IBL routine is presented with respect to FIGS. 6A–D.

Figure 7:
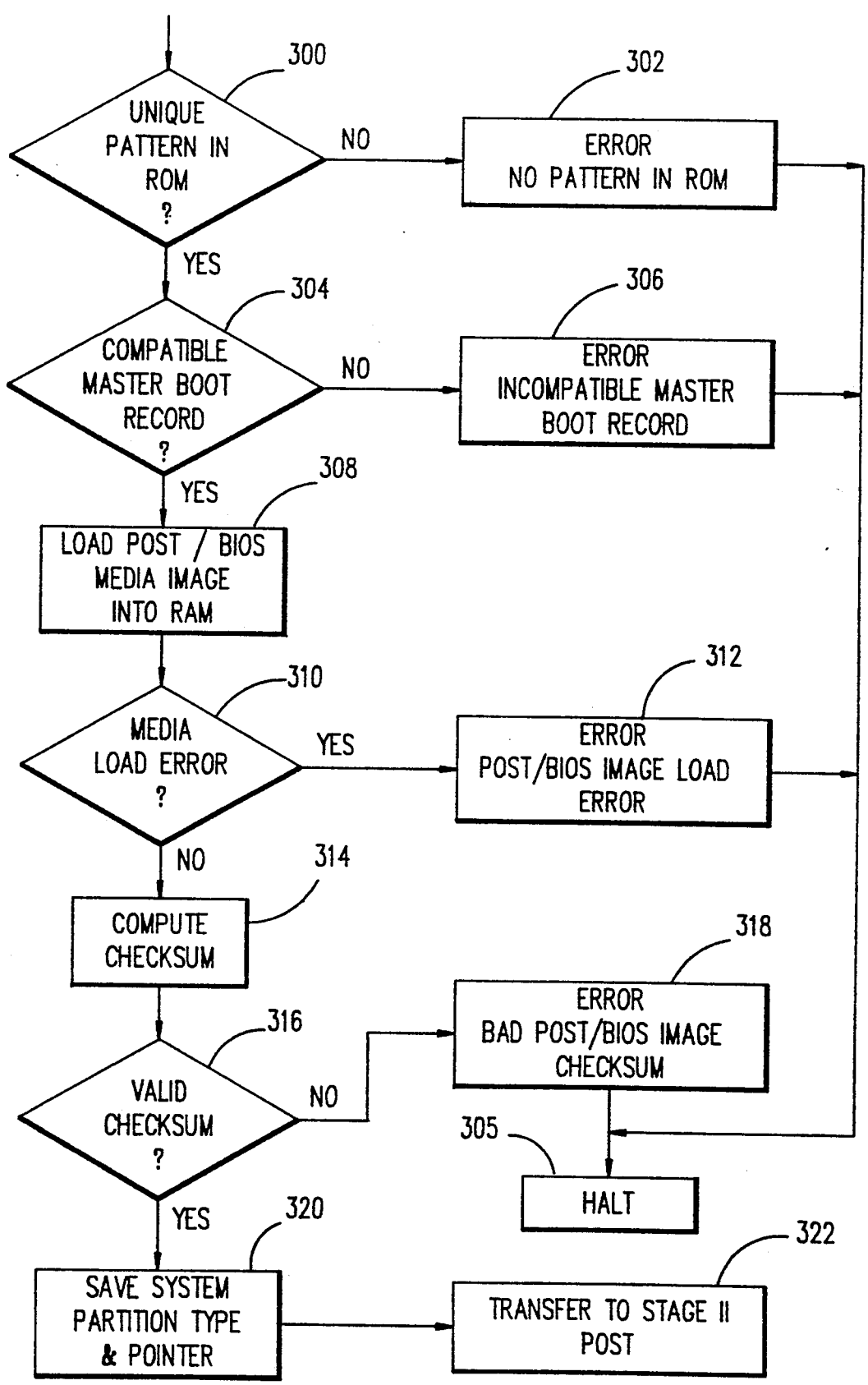
FIG. 7 is a detailed flowchart showing the operation of the executable code segment of the master boot record.
Figure 8:
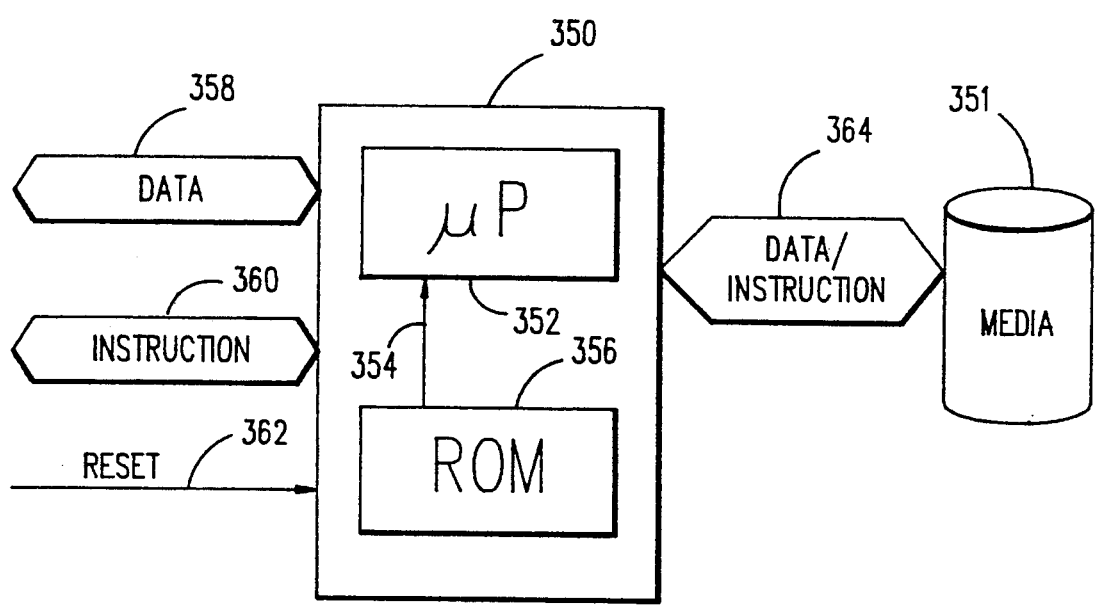
FIG. 8 is a block diagram for the controller of the direct access storage device.
Figure 9:
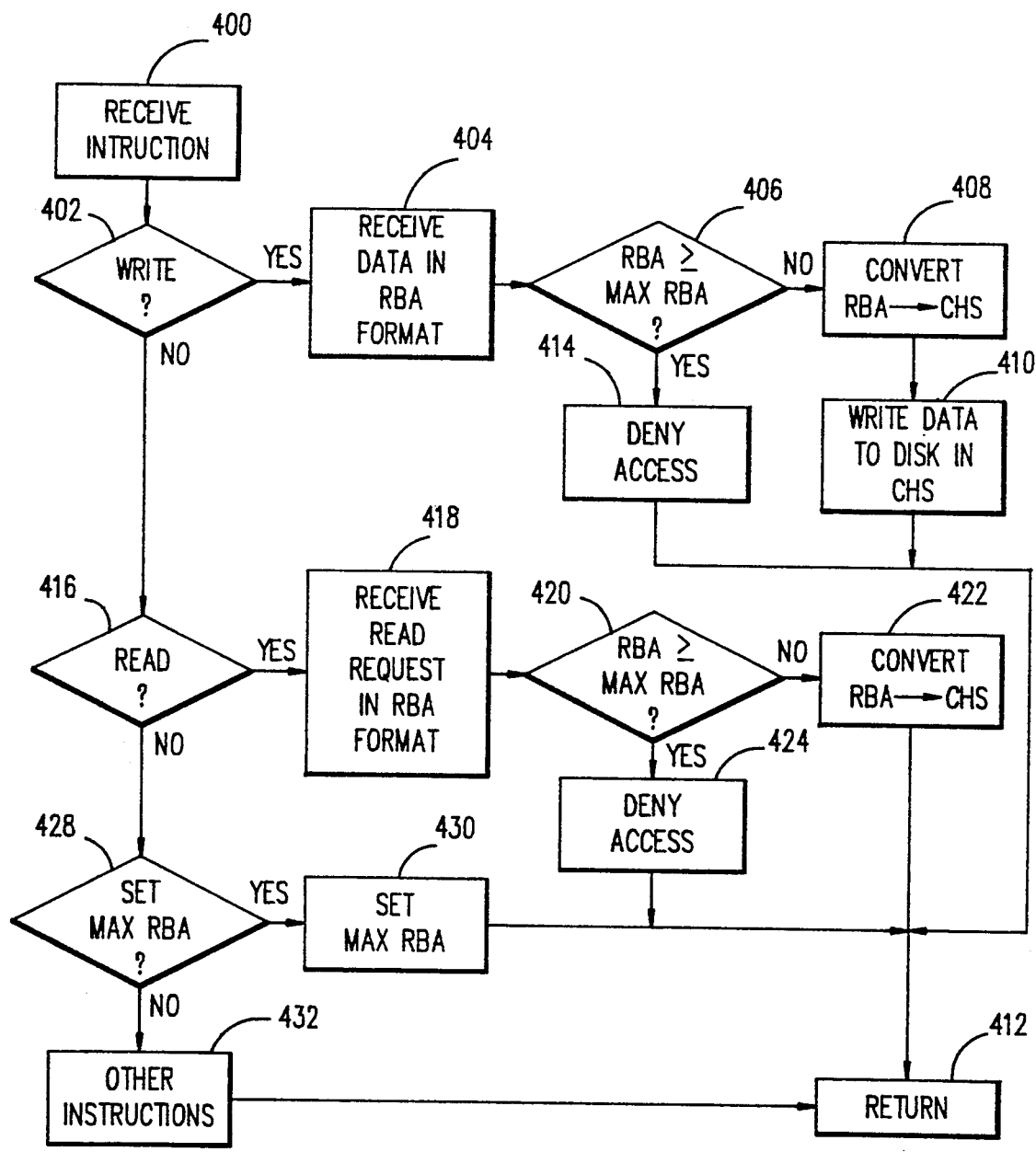
FIG. 9 is a flow diagram showing the operation of a disk controller to protect the IBL image stored on a disk drive.
Figure 10:
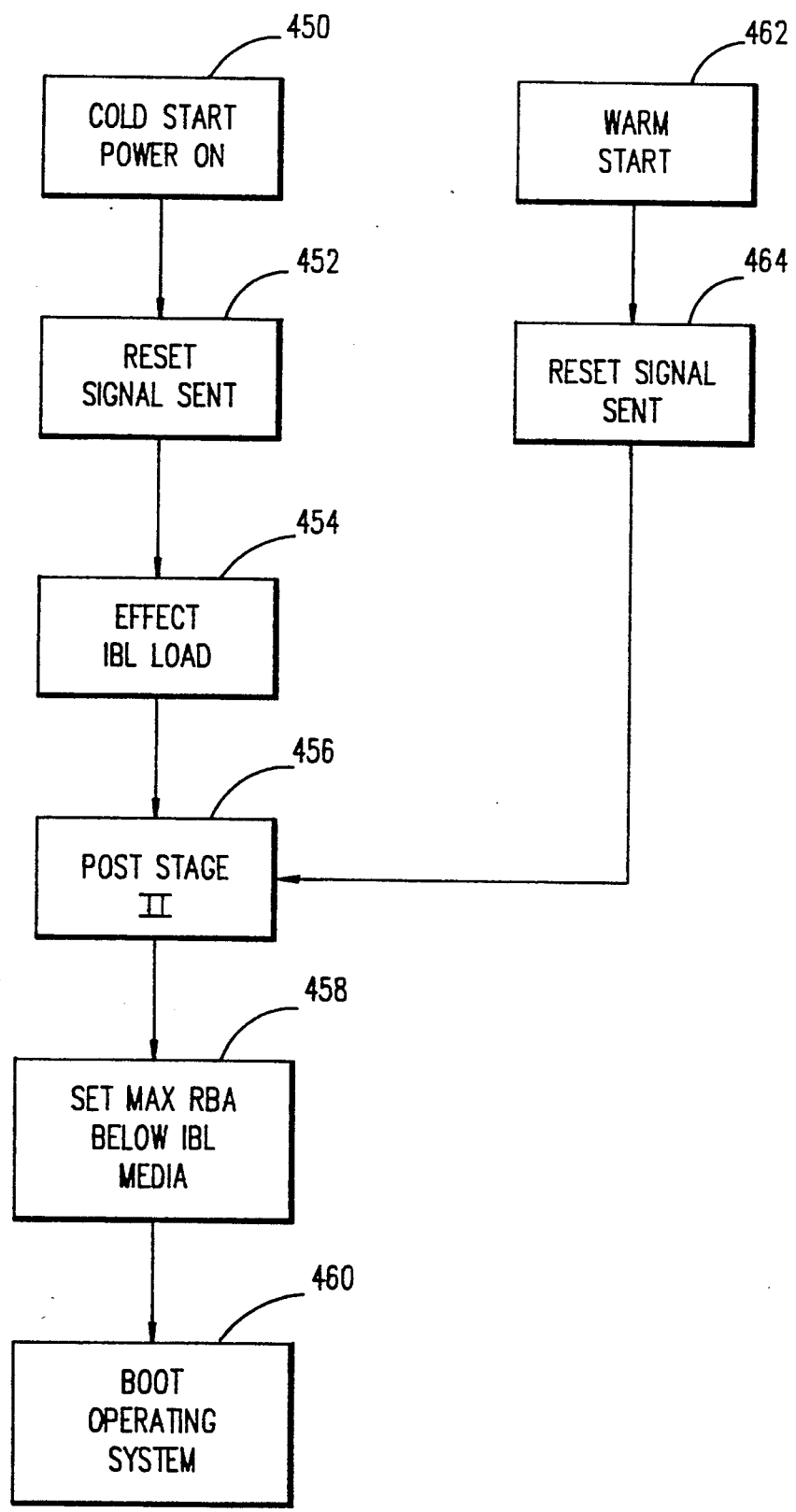
FIG. 10 is a flowchart showing a method for protecting the BIOS image.

With continuing reference to FIG. 4, after the IBL routine loads the master boot record into RAM, the system processor is vectored to the starting address of the MBR code to begin execution, step 106. The MBR code performs a series of validity tests to determine the authenticity of the BIOS image and to verify the configuration of the system. For a better understanding of the operation of the MBR code, attention is directed to FIG. 7 of the drawings wherein the MBR code is described in greater detail. On the basis of these validity tests, the MBR code loads the BIOS image into RAM and transfers control to the newly loaded BIOS image in main memory, step 108. In particular, the BIOS image is loaded into the address space previously occupied by ROM-BIOS. That is if ROM-BIOS is addressed from E0000H through FFFFFH, then the BIOS image is loaded into this RAM address space thus superseding ROM-BIOS. Control is then transferred to POST Stage II which is included in the newly loaded BIOS image thus abandoning ROM-BIOS. POST Stage II, now in RAM, initializes and tests the remaining system in order to load the operating system boot, steps 110–114. Before POST Stage II transfers control to the operating system, POST Stage II sets a protection means for preventing access to the disk partition holding the BIOS image. However, if an error is detected, POST Stage II can disable the protection means and invoke the system utilities in the system reference diskette image on the disk. Reference is made to FIGS. 8–10 for a detailed discussion of this protection process. It is noted that during a warm start, the processor is vectored to step 108, bypassing steps 100–106.

Figure 5:
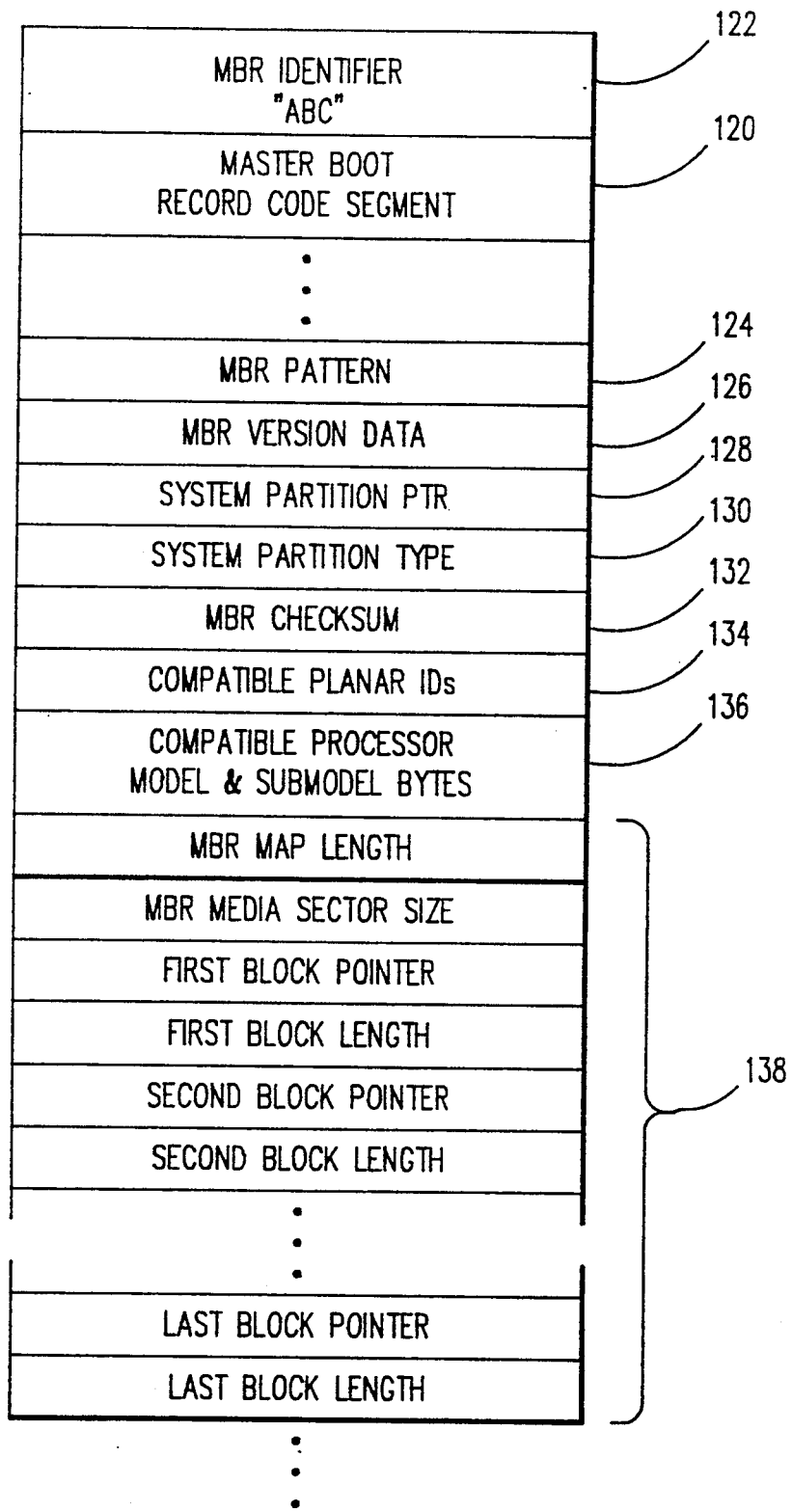
FIG. 5 illustrates the record format for the master boot record.

For clarity, it is appropriate at this point to illustrate a representation for the format of the master boot record. Referring to FIG. 5, there is shown the master boot record. The boot record includes the executable code segment 120 and data segments 122–138. The MBR code 120 includes DASD dependent code responsible for verifying the identity of the ROM-BIOS, checking that the master boot record is compatible with the system, verifying the system configuration, and loading the BIOS image from the selected DASD (disk or diskette). The data segments 122–138 include information used to define the media, identify and verify the master boot record, locate the BIOS image, and load the BIOS image.

The master boot record is identified by a boot record signature 122. The boot record signature 122 can be a unique bit pattern, such as a character string "ABC", in the first three bytes of the record. The integrity of the master boot record is tested by a checksum value 132 which is compared to a computed checksum value when the boot record is loaded. The data segments further include at least one compatible planar ID value 134, compatible model and submodel values 136. The master boot record's planar ID value defines which planar that the master boot record is valid for. Similarly, the master boot record's model and submodel values define the processor and planar I/O configuration respectively that the master boot record is valid for. It is noted that the boot record's signature and checksum identify a valid master boot record, while the boot record's planar ID, boot record's model and boot record's submodel comparisons are used to identify a boot record compatible with the system and to determine if the system configuration is valid. Another value, boot record pattern 124 is used to determine the validity of the ROM-BIOS. The boot record pattern 124 is compared to a corresponding pattern value stored in ROM. If the values match this indicates that a valid ROM-BIOS has initiated the load of a BIOS image from the selected media.

The following description further describes in greater detail each of the values in the master boot record and their functions:

MBR Identifier (122): The first three bytes of the IBL boot record can consist of characters, such as "ABC". This signature is used to identify a boot record.

MBR Code Segment (120): This code verifies the compatibility of the boot record with the planar and processor by comparing corresponding planar id and model/submodel values. If these values match, it will load the BIOS image from the chosen media to system RAM. If the system image (BIOS image loaded into memory) checksum is valid and no media load errors occur, the MBR code will transfer control to the POST Stage II routine of the system image.

MBR Pattern (124): The first field of the IBL boot record data segment contains a pattern, such as a character string "ROM-BIOS 1990". This string is used to validate the ROM-BIOS by comparing the Boot Pattern value to the corresponding value stored in ROM (ROM-Pattern).

MBR Version Date (126): The master boot record includes a version date for use by an update utility.

System Partition Pointer (128): The data segment contains a media pointer to the beginning of the media system partition area for use by POST. On an IBL diskette, the pointer is in track-head-sector format; on disk the pointer is in Relative Block Address (RBA) format.

System Partition Type (130): The system partition type indicates the structure of the media system partition. There are three types of system partition structures—full, minimal and not present. The full system partition contains the setup utility and diagnostics in addition to the BIOS image and master boot record. The minimal system partition contains just the BIOS image and master boot record. It may occur where a system does not have access to a hardfile having an IBL image, in this circumstance the system partition type indicates not present. In this instance, IBL will occur from the diskette. These three system partition types allow flexibility in how much space the system partition takes up on the media.

MBR Checksum Value (132): The checksum value of the data segment is initialized to generate a valid checksum for the record length value (1.5k bytes) of the master boot record code.

MBR Planar ID Value (134): The data segment includes a value, such as a string of words defining compatible planar IDs. Each word is made up of a 16 bit planar ID and the string is terminated by word value of zero. If a system's planar ID matches the planar ID value in the master boot record, such as one of the words in the string, the IBL image is compatible with the system planar. If the system's planar ID does not match any word in the string, the IBL image is not compatible with the system planar.

MBR Model and Submodel Values (136): The data segment includes values, such as a string of words defining compatible processors. Each word is made up of a model and submodel value and the string is terminated by a word value of zero. If a system's model and submodel value (stored in ROM) match one of the words in the string, the IBL image is compatible with the system processor. If the ROM model and ROM submodel values do not match any word in the string, the IBL image is not compatible with the system processor.

MBR Map Length (138): The IBL map length is initialized to the number of media image blocks. In other words, if the BIOS image is broken into four blocks, the map length will be four indicating four block pointer/length fields. Usually this length is set to one, since the media image is one contiguous 128k block.

MBR Media Sector Size (138): This word value is initialized to the media sector size in bytes per sector.

Media Image Block Pointer (138): The media image block pointer locates a system image block on the media. Normally, there is only one pointer since the media image is stored as one contiguous block. On an IBL diskette, the pointers are in track-head-sector format; on disk the pointers are relative block address format.

Media Image Block Length (138): The media image block length indicates the size (in sectors) of the block located at the corresponding image block pointer. In the case of a 128k contiguous media image, which includes space for BASIC, this field is set to 256, indicating that the BIOS image block takes up 256 sectors (512 bytes/-sector) starting at the media image block pointer location.

Referring now to FIGS. 6A-D, there is shown a detailed flow chart of the operation of the IBL routine. Under normal circumstances, the IBL routine loads the master boot record from the system fixed disk into RAM at a specific address and then vectors the system processor to begin executing the code segment of the master boot record. The IBL routine also contains provisions for a diskette default mode in which the master boot record can be loaded from diskette. However, the IBL routine does not allow the diskette default mode to be performed if the system contains the IBL image on the system fixed disk and a valid password is present in NVRAM. The user has the option of setting the password in NVRAM. The purpose cf preventing the diskette default mode from being effected is to prevent loading an unauthorized BIOS image from diskette. In other words, the diskette default mode is used only when a system fixed disk is not operational and the user has indicated (by not setting the password) the desire to be able to load from the diskette. If the IBL routine is not able to load the master boot record from either media, an error message is generated and the system is halted.

Figure 6A:
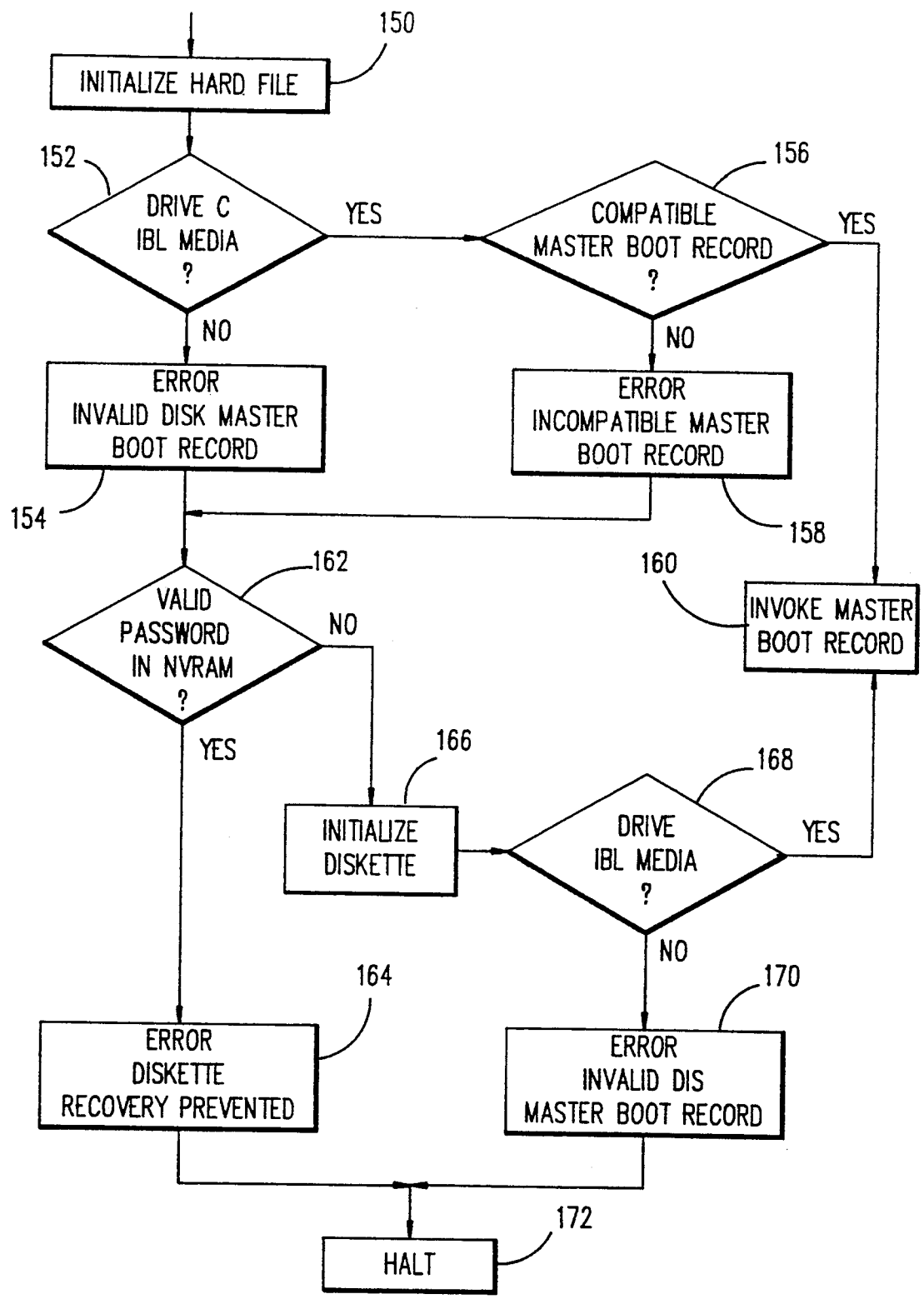
FIG. 6A is a flowchart describing the operation of the IBL routine.
Figure 6B:
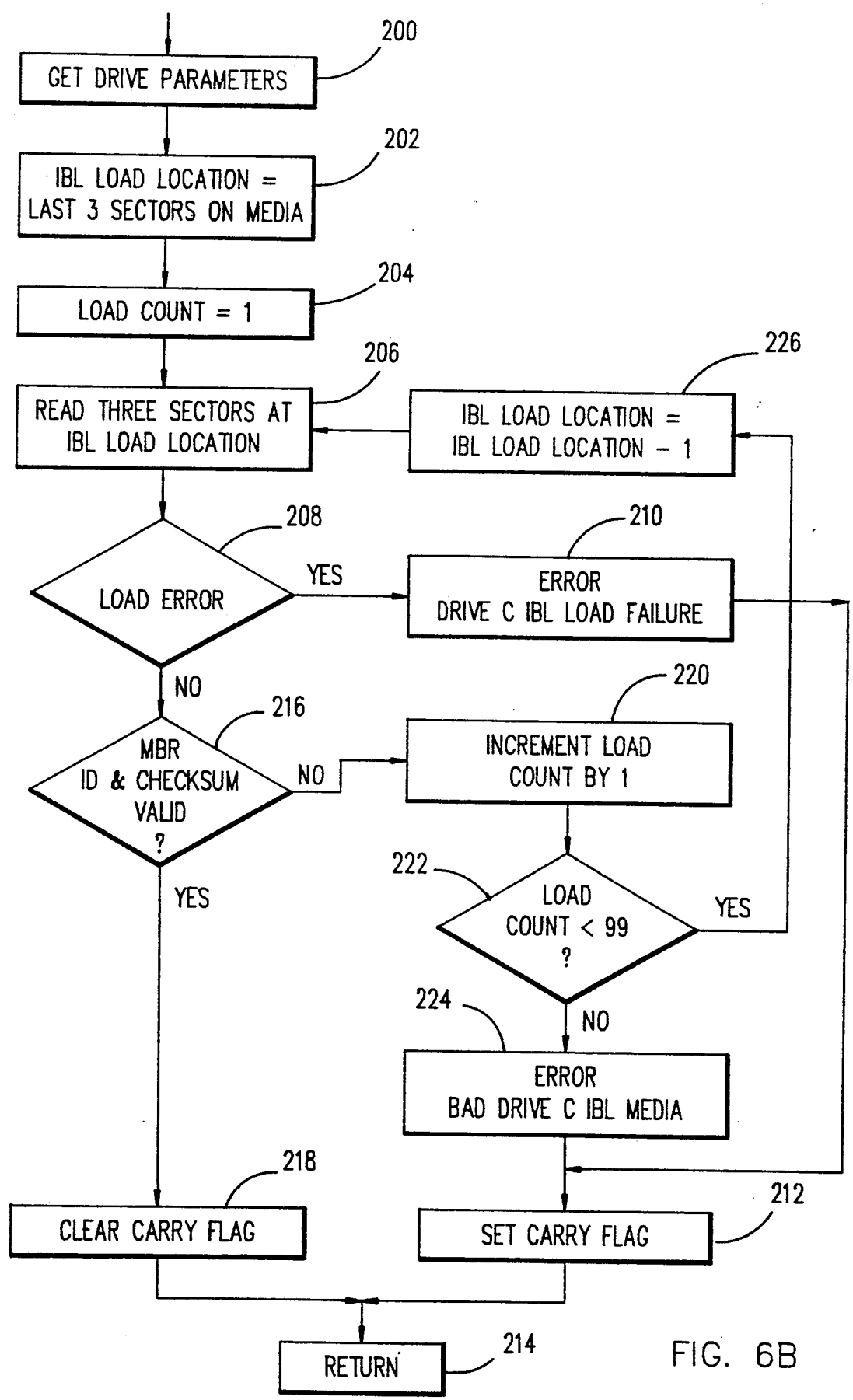
FIG. 6B is a flowchart showing the steps for loading a Master Boot Record from a fixed disk.

Referring now to FIG. 6A, under normal circumstances the system will contain a system fixed disk which the IBL routine initializes, step 150. Assume for purposes of illustration that the fixed disk is configured for Drive C of the personal computer system. Similarly, assume Drive A is designated as the diskette drive. The IBL routine then examines Drive C to determine whether it contains IBL image, step 152. Attention is directed to FIG. 6B which describes in detail this process. The IBL routine starts reading from the fixed disk at the last three sectors and continues reading, decrementing the media pointer, for 99 sectors or until a valid master boot record is found. If a master boot record is found, it is checked for system planar and processor compatibility, step 156. If it is not planar or processor compatible, then an error is reported, step 158. Referring back to step 152, if no master boot record is found on the last 99 sectors of the fixed disk (primary hardfile), an error is reported, step 154.

Referring back to step 156, if a master boot record is found, a series of validity checks are performed to determine if the master boot record is compatible with the computer system. Additionally, the configuration of the system is checked. Attention is directed to FIG. 6D which discloses this process in greater detail. If the boot record is compatible with the planar ID, model and submodel, and if furthermore the system configuration has not changed the master boot record is loaded and the code segment of the master boot record is executed, step 160.

Referring back to steps 154 and 158, if an error occurs in loading the master boot record from the fixed disk or if a fixed disk is not available, the IBL routine determines if a valid password is included in NVRAM, step 162. This password determines whether the BIOS image can be loaded from diskette. Note that the password will exist only upon being loaded the user running a set features utility. If a password is installed in NVRAM, the BIOS image is prevented from being loaded from diskette, step 164. This permits the user to ensure the integrity of the operation of the system by causing the system to be loaded only with the BIOS image on the fixed disk. The password can take the form of a string of characters stored in NVRAM.

Figure 6C:
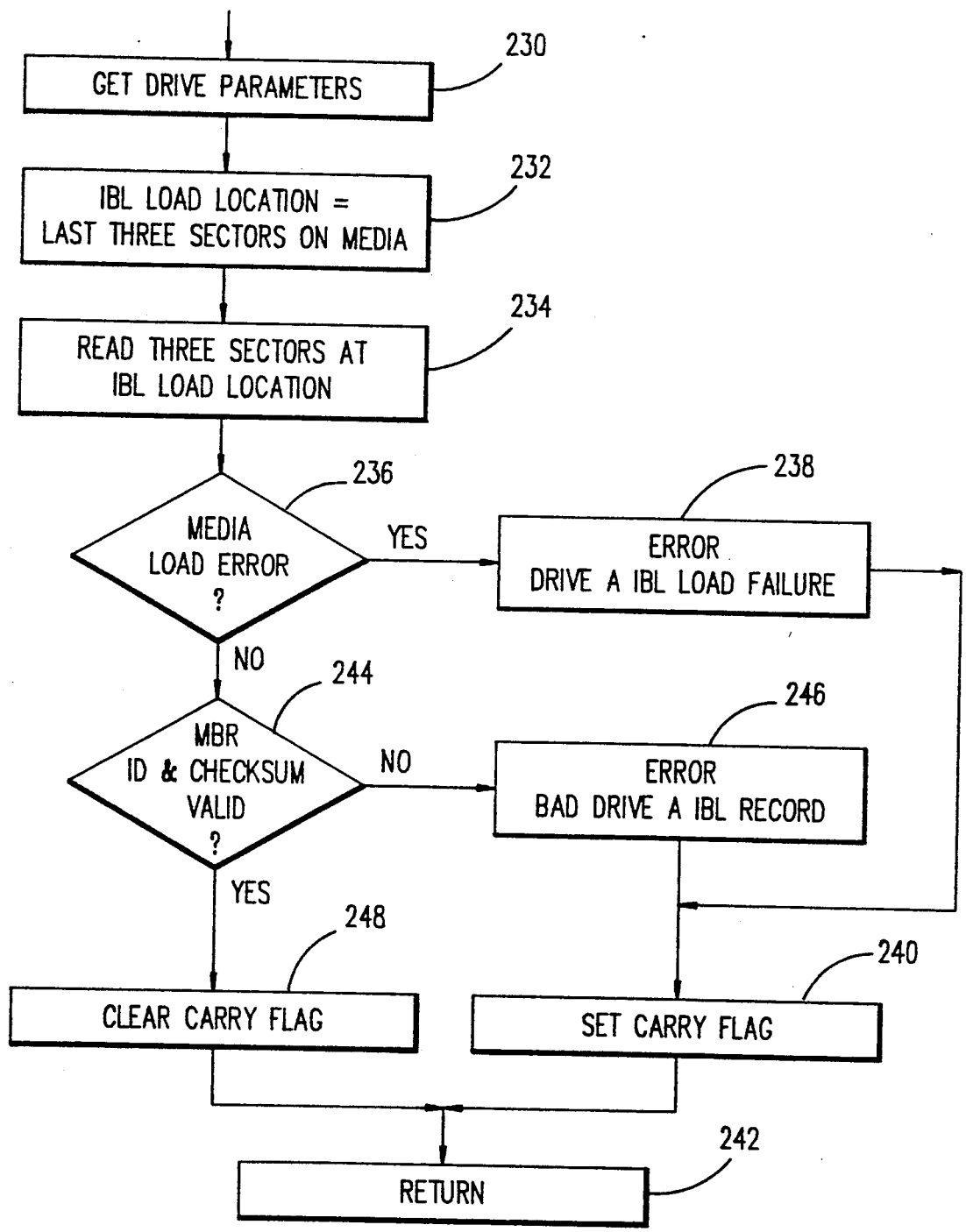
FIG. 6C is a flowchart showing the steps for loading the Master Boot Record from a diskette.
Figure 6D:
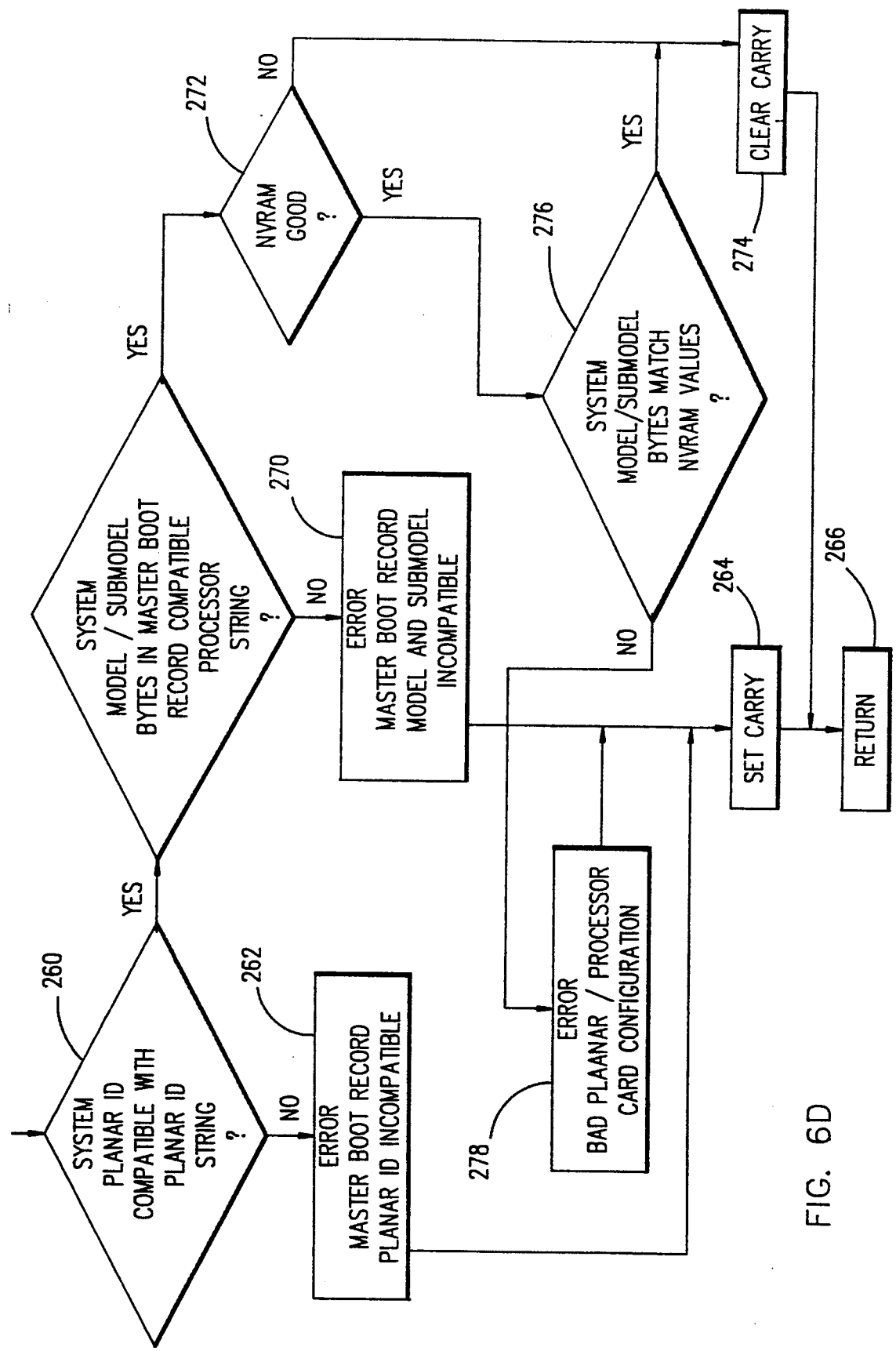
FIG. 6D is a flowchart showing greater detail in checking the compatibility between the master boot record and the planar/processor.

Referring back to step 162, if a valid password in NVRAM is not present, thus allowing BIOS image to be loaded from diskette, the IBL routine initializes the diskette subsystem, step 166. The IBL routine then determines if Drive A includes the IBL image on a diskette, step 168. If Drive A does not include IBL image, an error is generated to notify the user that an invalid diskette has been inserted in the drive, step 170. The system then halts, step 172. Attention is directed to FIG. 6C for a more detailed discussion of step 168.

Referring back to step 168, after Drive A is checked for IBL media, the master boot record is loaded into RAM and the code segment included in the master boot record is executed, step 160. It is important to note that for diskette the IBL routine does not include the validity checks that are used with the fixed disk system. The reason for the absence of the validity checks is for loading a non-compatible IBL image from diskette. For example, if a new processor is added to the system, a new BIOS image will be included on a diskette. Since a new processor will cause validity errors when loading from fixed disk, the IBL routine provides the ability to bypass these tests by loading the BIOS image from diskette.

To recapitulate, the master boot record is checked for compatibility with the system through matching the system planar ID and processor model/submodel values to the boot record value s. For disk, this check is done first in the IBL routine 72 and then done again in the IBL boot record. The first check (in the IBL routine) is done to make sure the boot record is compatible with the system; the second check (in the boot record) is done to ensure a compatible ROM passed control to the boot record. Notice that the check done in the disk boot record will never fail for a compatible ROM since the IBL routine will have already checked the compatibility. In contrast, the first compatibility check is not done for diskette. The planar/processor compatibility is checked only during diskette boot record execution. This method allows future modifications in loading a new BIOS image from a reference diskette.

In view of the description of the IBL routine of FIG. 6A, the explanation will now proceed to a comprehensive and full understanding of the validity tests discussed above. Referring to FIG. 6B, there is shown a detailed flowchart of step 152 of FIG. 6A, to determine if a valid master boot record is on drive C. The process begins by obtaining the drive parameters to enable the IBL routine to access drive C, step 200. An IBL load location is set to the last three sectors from the disk (the last three sectors normally contain the master boot record), step 202. A load count indicating the number of attempts to read a master boot record from disk is set to 1, step 204. Three sectors are read from disk at the IBL load location, step 206. Any disk drive errors are detected and if a disk drive read error occurs it is reported, steps 208-210. The process then returns with an error indication, steps 212-214.

Referring back to step 208, if no drive error occurs, the disk record is scanned for the master boot record signature, step 216. The boot record signature, such as the characters "ABC", are compared to the first three bytes of the disk record. If the disk record does have a valid boot record signature (characters "ABC") and the checksum computed from the disk record loaded into memory equals the boot record checksum, the disk record is indicated as being a valid boot record with no errors, step 218. The process then returns, step 214.

Referring back to step 216, if the boot record signature or checksum is invalid, the load count is incremented by 1, step 220. The load count is then compared to a predetermined constant such as 99, step 222. If 99 attempts to read a boot record have resulted in failure, an error is indicated and the process returns, steps 224, 212 and 214. If less than 99 attempts to read a boot record have occurred, the IBL load location is decremented by one and three new sectors are read from the new load location, steps 226 and 206. Thus if a valid master boot record cannot be loaded from the last 99 sectors (equivalent to 33 copies) then an error condition is set and control returns to the IBL routine.

Referring now to FIG. 6C, there is shown a detailed flow diagram for loading the master boot record from diskette on drive A. First, the diskette drive parameters to access drive A are retrieved, step 230. The IBL load location is set to the last 3 sectors on diskette (cylinder, head and sector format), step 232. The last 3 sectors are read, step 234. If a diskette drive error is detected an error is indicated, steps 236-238. An error condition is set and control is returned to the IBL routine, steps 240-242.

Referring back to step 236, if no drive error is detected, the diskette record is checked for boot record signature and the checksum is calculated, step 244. If the boot record signature is missing or checksum is invalid, an error is indicated and control returned to the IBL routine, steps 244, 246, 240 and 242. If a valid boot record signature and valid checksum are detected an indication is set and control is returned to the IBL routine, steps 248 and 242. It is noted that in a diskette load, the IBL routine does not search through the media as in the fixed disk load. Therefore, in a diskette load, the IBL image must be stored in a specific location of the diskette.

Finally, FIG. 6D shows how the IBL routines tests for system planar and processor compatibility and for a proper system configuration. The master boot record is checked for compatibility with the system planar by comparing the boot record planar ID value to the system planar ID read by the system processor, step 260. If the system planar ID does not match the boot record planar ID value, this indicates this master boot record is not compatible with this planar. An error is indicated and control returns to the IBL routine, steps 262, 264, and 266.

If the master boot record is compatible with the planar, the master boot record is checked for compatibility with the processor, step 268. The boot record model value and submodel value are compared to the model value and submodel value stored in ROM respectively. A mismatch indicates a new processor has probably been inserted and this boot record is not compatible with the new processor. An error is indicated and control returned to the IBL routine, steps 270, 264 and 266. If the master boot record is compatible with the planar and processor, the process checks to determine if NVRAM is reliable, step 272. If NVRAM is unreliable, an error condition indicating NVRAM is bad is recorded. In this situation, the IBL routine allows the IBL procedure to occur in case non volatile storage lost its contents due to its power source needing replacement or system board replacement due to a hardware problem. Control is then returned to the IBL routine, steps 274 and 266. If NVRAM is reliable, the system configuration is checked, step 276. A change in system configuration is indicated if the model and submodel values stored in NVRAM do not match the model and submodel values stored in ROM. Note that this last comparison will only indicate a configuration error. If a configuration error is indicated, an error is generated for the user. This error notifies the user that the configuration of the system has changed since the last time Set Configuration was run. The user is notified of the changed configuration and control passed back to the IBL routine steps 278, 264, and 266. This error is not fatal itself, but notifies the user that Set Configuration (configuration program) must be executed. Referring back to step 276, if the system model/submodel values match, an indication of comparability is set and the routine returns, steps 276, 274 and 266. Thus, the compatibility between the master boot record and the system are tested along with determining if the system configuration has been modified.

After the IBL routine loads the master boot record into RAM, it transfers control to the MBR code starting address. Referring to FIG. 7, the executable code segment of the master boot record first verifies the boot record pattern to the ROM pattern, step 300. If the pattern in the master boot record does not match the pattern in ROM, an error is generated and the system halts, steps 302 and 305. The check for equality between ROM and boot record patterns ensures that the master boot record loaded from either the disk or diskette is compatible with the ROM on the planar board. Referring back to step 300, if the pattern in ROM matches the pattern in the boot record, the MBR code compares the system planar ID value, model and submodel value against the corresponding master boot record values, step 304. This process was discussed in greater detail with respect to FIG. 6D. If the values don't match, the master boot record is not compatible with the system planar and processor, or the system configuration has changed, and an error is generated, step 306. The system will halt when the master boot record is incompatible with planar, model or submodel values, step 305.

Referring back to step 304, if the system planar ID value, model and submodel values match the corresponding master boot record values, the MBR code loads the BIOS image from the selected media into the system RAM, step 308. If a media load error occurs in reading the data, step 310, an error is generated and the system halts, steps 312 and 305. Referring back to step 310, if no media load error occurs, a checksum is calculated for the BIOS image in memory, step 314. If the checksum is invalid an error is generated and the system halts, steps 318 and 305. Referring back to step 316, if the checksum is valid, the system partition pointers are saved, step 320, and the system processor is vectored to POST Stage II to begin loading the system, step 322.

Referring to FIG. 8, there is shown a block diagram of an intelligent disk controller 350 for controlling movement of data between the disk drive 351 and the system processor. It is understood that disk controller 350 can be incorporated into the adapter card 60 while disk drive 351 can be included onto drive 62 of FIG. 2. A suitable disk controller 350 is a SCSI Adapter having a part number of 33F8740, which is manufactured by International Business Machines Corporation. It is understood that the disk controller 350 includes a microprocessor 352 operating under its own internal clock, for controlling its internal operations as well as its interfacing with the other elements of the disk subsystem and the system processor. The microprocessor 352 is coupled by a instruction bus 354 to a read only memory (ROM) 356 which stores instructions which the disk controller 350 executes to process and control the movement of data between the disk drive and the system processor. It is also understood that disk controller 350 can include random access memory coupled to microprocessor 352 for the storage or retrieval of data. The movement of data between disk controller 350 and the system processor is effected by data bus 358 and instruction bus 360. A reset signal on line 362 resets or initializes the disk controller logic upon power-on sequence or during a system reset. The reset signal is generated by the planar board logic, and can take the form of a channel reset signal as provided by IBM's Micro Channel architecture as described in "IBM PERSONAL SYSTEM/2 Seminar Proceedings", Volume 5, Number 3, May 1987 as published by the International Business Machines Corporation Entry Systems Division. Furthermore, the reset signal can be effectively initiated by BIOS outputting a particular bit configuration to an I/O port of the system processor in which the planar logic is connected.

As is well known, the microprocessor 352 provides all the interfacing and timing signals to effect the efficient transfer of data between the disk drive and the system processor. For clarity, only those signals important for the understanding of the invention are presented. It is understood that other signals and lines, such as data bus 364, are used but are not presented here since they are not important for the understanding of the present invention. It is further understood that only those programs or routines as stored in ROM 356 important for the understanding of the present invention are explained with respect to FIG. 9.

Referring now to FIG. 9, there is shown a flowchart diagramming the read, write, and protect functions of the disk controller which are effected by the operation of routines stored in ROM 356. In operation, a disk instruction is initiated by the system processor and transferred to the disk controller 350. The disk controller receives and interprets the instruction to perform the designated operation, step 400. The disk controller first determines if this is a write operation in which data from the system processor are stored on the disk drive hardware, step 402. If the instruction is a write instruction, data are received from the system processor in relative block address (RBA) format.

Prior to continuing the discussion above, a brief explanation of the relative block address format applied to a mass storage device, such as a disk, may merit review. RBA is a scheme in which data in mass storage are addressed in predetermined sized blocks by sequential numbers, i.e. individual definable contiguous blocks of data. For example, assuming a block size of 1024 bytes, the system processor can approximately address 10,000 blocks for a 10 megabyte disk. That is, the system processor can address the disk media in terms of N blocks where N ranges from 0 to 9,999. It has been discovered, that the use of RBA provides a very fast and efficient method for addressing mass storage in the type of operating systems used for personal computer systems of the present invention.

For convenience sake, the following assumptions will be introduced: first, the disk can support a total of N blocks; second, the system processor transfers a K block, where K is greater than or equal to 0 and is less than or equal to (N−1); third, the disk controller can set a maximum addressable block M which permits access to data blocks where K is less than M and denies access to data blocks where K is greater than or equal to M. Note, by setting M less than N a protectable region on the disk is generated from M to N−1 blocks. This feature permits the IBL image to be protected as will be discussed below.

Continuing our discussion with reference to FIG. 9, the data are received from the disk in RBA format, step 404. The disk controller then determines if the received block K is less than the maximum block value M, where M is less than N, step 406. If K is less than M then the disk controller converts the RBA format into the particular format for the mass storage device, such as cylinder-head-sector (CHS) format for a fixed disk, step 408. For instance, the disk controller by using a look up table could convert RBA addresses to unique cylinder-head-sector location. Another method is the use of a conversion formula to convert RBA to CHS. For example, for a disk having one head, 64 cylinders, and 96 sectors: Head=0, cylinders=Integer quotient of RBA/(96), and sectors=remainder of RBA/(96). After converting the RBA format to a CHS format the data are written to disk at the converted CHS location, step 410. The disk controller then waits for another instruction from the system processor, step 412.

Referring back to step 406, if the received RBA is greater than the maximum set RBA value, access is denied, step 414. That is if K is greater than or equal to M, the K block is not written to the disk. Please note, if the IBL image is stored in the blocks from M to N−1, then the IBL image will be protected from writing.

Referring back to step 402, if the instruction from the system processor is not a write instruction, it is tested for being a read instruction, step 416. If the instruction is a read instruction, the system processor sends the RBA format for the data requested, step 418. The disk controller then determines if the desired RBA (K) is less than the maximum set RBA (M). If the desired RBA (K) is less-than the maximum set RBA (M), then the disk controller converts the RBA to the appropriate CHS format and reads the data from the disk, steps 422 and 424. The data are then transferred to the system processor, step 412.

Referring back to step 420, if the received RBA (K) is greater than or equal to the maximum set RBA (M), access is denied, step 426. If the IBL image is stored between M blocks and (N−1) blocks, access is denied to this area. Please note, that in this circumstance, the IBL image is also protected from copying.

Referring back to step 416, if the instruction is not a write or read instruction, it is tested for a set maximum RBA instruction, step 428. This instruction allows the disk controller to create a protectable area or partition on the disk drive hardware. This instruction allows the disk controller to set M between 0 and N blocks, step 430. It is important to note that when the disk controller is reset (through the reset signal) that M is set so that the maximum number of blocks are available. That is, when the disk controller is reset, M=N. Essentially, protection for the protectable area is eliminated upon resetting the disk controller, allowing access to the area. However, once the set maximum RBA instruction is executed only a reset or another set maximum RBA instruction will allow access to the protectable area. Conceptually, the setting of the maximum RBA can be thought of as setting a fence which protects access to the area above the fence while allowing access to the area below the fence. The disk controller then returns to wait for another instruction, step 412.

Referring back to step 428, if the instruction is not a read, write, or set maximum RBA instruction, it is tested for another disk controller instruction and executed, step 432. These instructions will use the set maximum RBA value but are not important for the understanding of the present invention and are not presented here for brevity purposes. The disk controller then returns to wait for another instruction, step 412.

The explanation will now proceed to the operation of the loading in and protecting the IBL image in view of the proceeding discussion. In general, from either a cold start (power-on) or a warm start (Ctrl-Alt-Del), the disk controller having the IBL media is reset. This causes the maximum RBA (M) to be set to N, i.e. the fence is removed allowing access to the IBL image. This is required to allow the system to load the IBL image to begin operation. Once the IBL image is loaded and executed the fence is erected (set maximum RBA below IBL image) to prevent access to the IBL image stored on disk.

Referring now to FIG. 10, there is shown a block flow diagram effecting the protection of the IBL image. From a power-on condition the system is initialized and BIOS initiates activity in planar board logic to send a reset condition to the disk controller, steps 450 and 452. The reset signal drops the fence and allows the system processor to access the IBL image previously stored on the disk in the area from M blocks to N blocks. The system loads the IBL image as previously described with reference to FIG. 4–7, step 454. During the IBL loading sequence POST Stage II is executed, step 456. One of the tasks of POST Stage II is to execute the set maximum RBA instruction with the maximum RBA set to the first block of the IBL image which is designated as M, step 458. M is dependent upon partition type (none, partial or full) as previously explained. This in effect sets the fence denying access to the IBL image while allowing access to other regions of the disk. The operating system is then booted up in a normal fashion, step 460.

If the system is started from a warm start condition, such as Ctrl-Alt-Del, the planar logic is commanded to reset the disk controller by POST Stage II, steps 462 and 464. This causes the fence to be dropped. In this circumstance, since the IBL image is already present in RAM, the IBL image is not loaded again. However, since the protection for the IBL image is eliminated POST Stage II must be executed to reset the fence, steps 456 and 458. The fence is erected protecting the IBL image and the system is then rebooted in a normal manner, step 460.

The IBL image is protected by addressing mass storage in blocks and setting a maximum block the system can access during normal operation. The IBL image is stored consecutively in those blocks between the maximum block accessible and the total number of blocks supported by the disk drive. A reset signal sent to the disk controller eliminates the maximum block accessible to permit the system to address the IBL image. The reset signal is generated during a power-on condition or a warm-start condition to permit access to the IBL image to boot up the system.

Figure 11A:
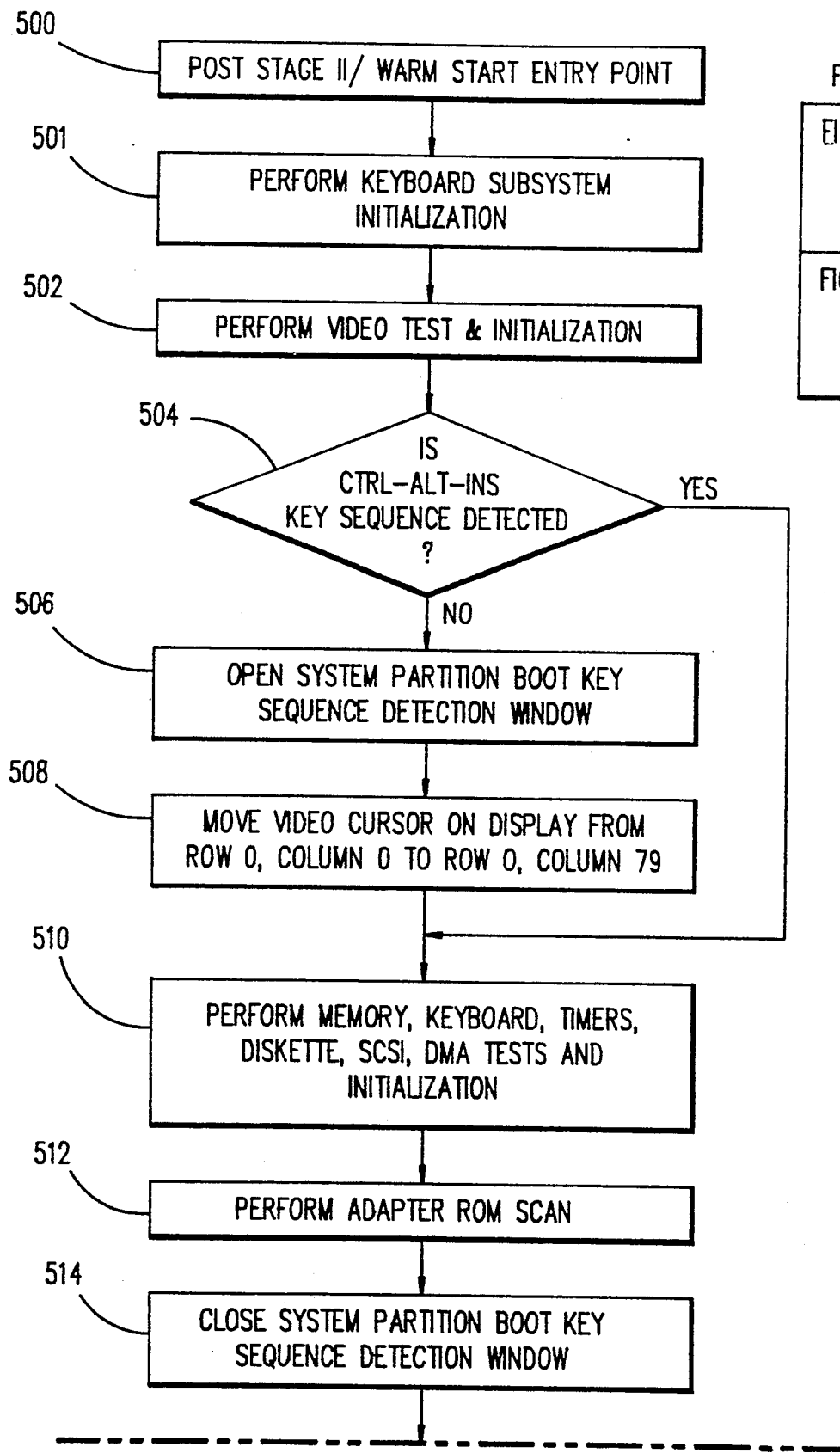
Figure 11B:
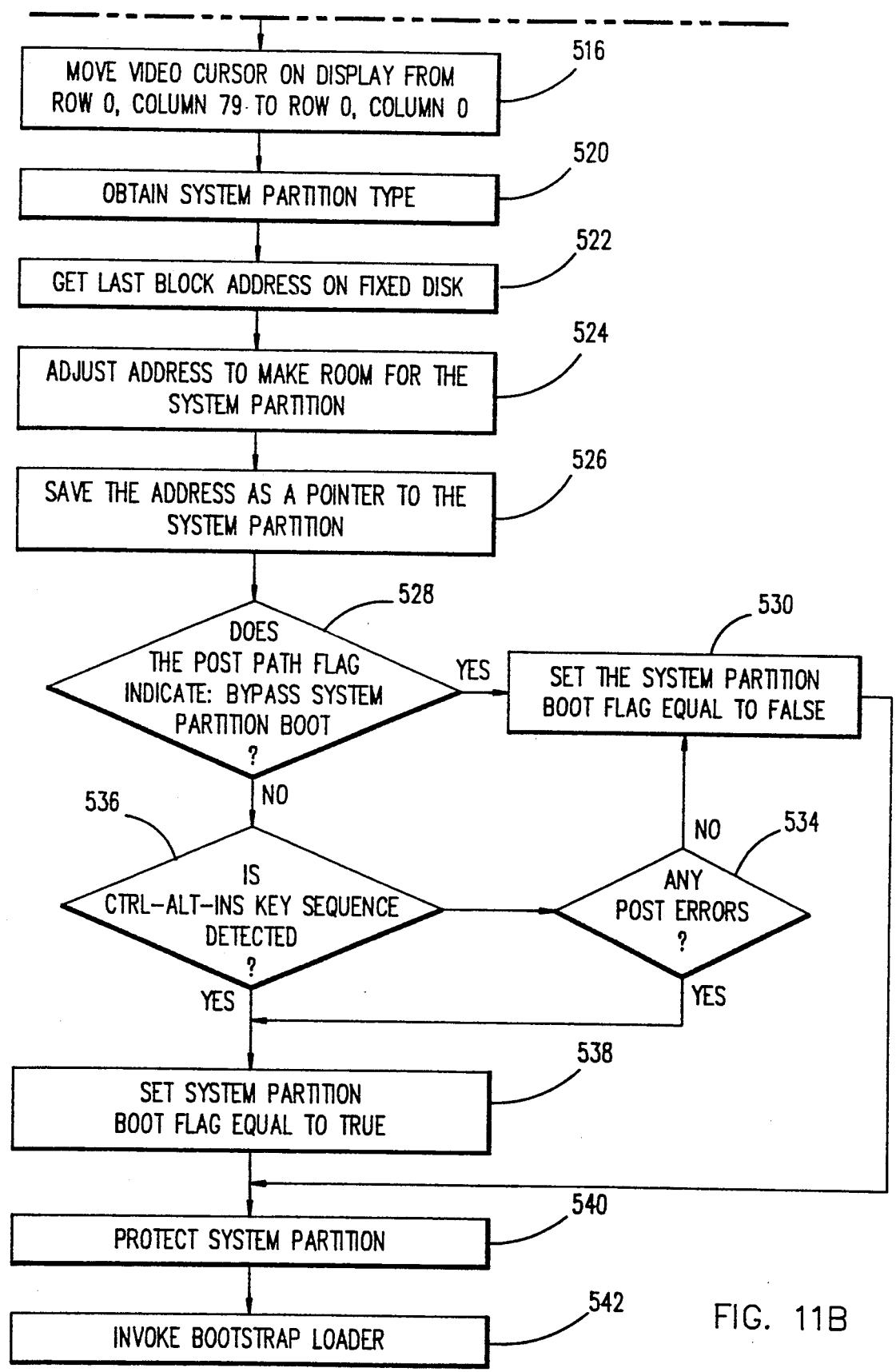

Referring now to FIG. 11, the flowchart describes the process by which POST Stage II loads the system reference diskette image from the system partition on the fixed disk 62, step 500. Prior to booting the operating system, such as PC/DOS or IBM's OS/2 , POST Stage II initializes the keyboard and its associated BIOS, step 501. POST Stage II then performs a Video Subsystem testing and special initializing, step 502. POST Stage II subsequently checks for a plurality of key keystroke sequence, such as Ctrl-Alt-Ins, step 504. If the unique sequence of keystrokes has already been detected, POST Stage II does not open the System Partition Boot Key Sequence Detection Window and proceeds directly to step 510. POST Stage II is capable of detecting the Ctrl-Alt-Ins key sequence prior to step 504, such as when the keyboard subsystem is initialized in step 501, and prior to video initialization, step 502. The keyboard BIOS is capable of recognizing the Ctrl-Alt-Ins key sequence and storing it in a manner that is similarly used for recognizing the Ctrl-Alt-Del key sequence which is well known.

Referring back to step 504, if the unique sequence of keystrokes has not been detected, POST Stage II opens the System Partition Boot Key Sequence Detection Window, step 506. POST Stage II then activates a visual display for the user by moving the video cursor on the active display from its current position of Row 0, Column 0 (upper left corner) to Row 0, Column 79 (upper right corner) in an 80 column display. This is done to indicate the opening of the System Partition Boot Key Sequence Detection Window to the user, step 508. It is noted that moving the cursor to the upper right corner would include a different column for other than an eighty (80) column display. The moving of the cursor to the upper right hand provides a system prompt to the user to indicate that the system utilities stored on the hardfile can be invoked.

In step 510, POST Stage II performs testing and initialization of other subsystems in the system. This includes memory, keyboard, timers, diskette drives and controllers, SCSI subsystem and DMA controller. Next, POST Stage II performs an adapter ROM scan in order to integrate adapters with on-board ROM code into the system, step 512.

At this point, POST Stage II closes the System Partition Boot Key Sequence Detection Window, step 514. POST Stage II moves the video cursor on the active display from Row 0, Column 79 (upper right corner) back to its original position, Row 0, Column 0 (upper left corner). This signifies to the user that the System Partition Boot Key Sequence Detection Window is closed, step 516. If the user had entered the key sequence anytime the window was open, POST Stage II sets an indicator, such as a keystroke-sequence flag, to indicate the detection of the keystrokes for later use.

Figure 13:
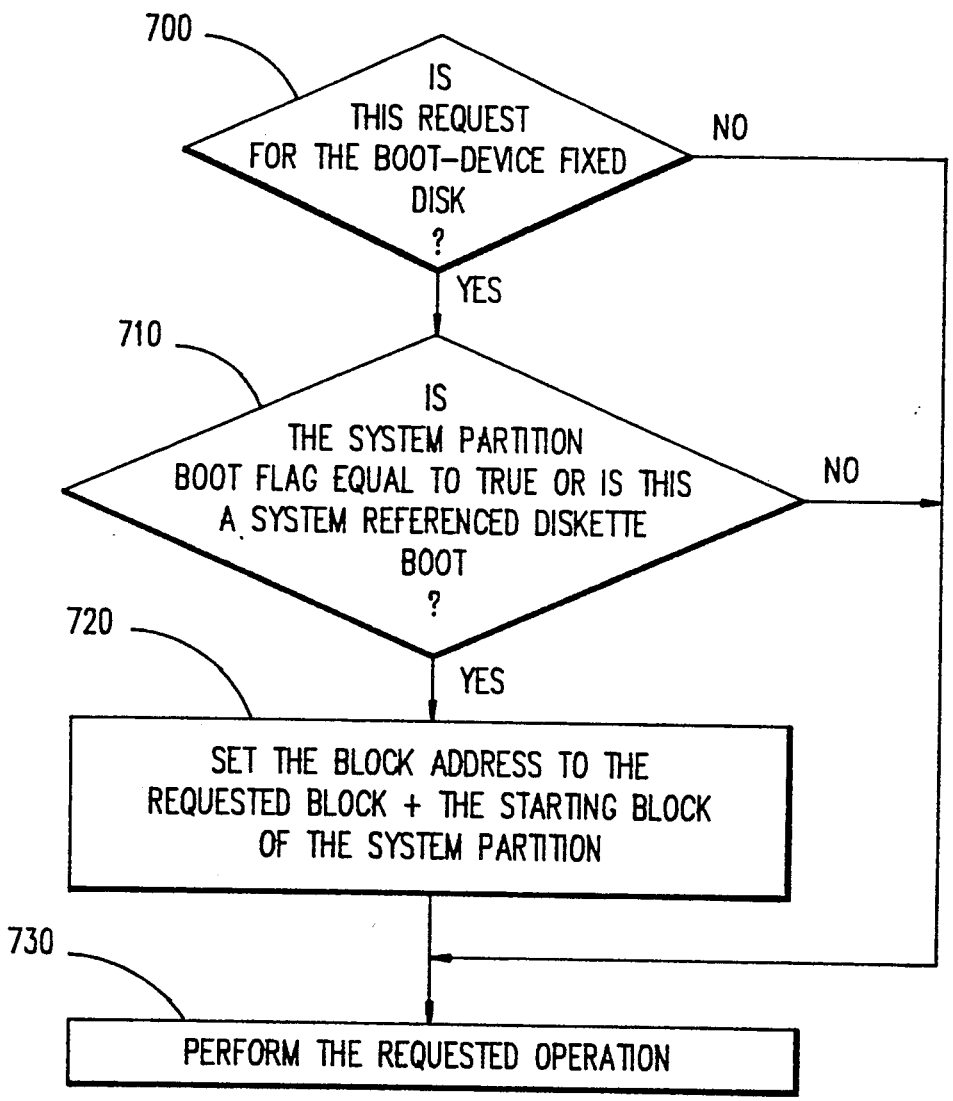
FIG. 13 is a flow diagram showing the modification to BIOS to enable the treatment of the system partition as the active partition on a fixed disk.

POST Stage II now ascertains the type of system partition present on the IBL media, step 520. POST Stage II then queries the fixed disk 62 for the value of the last block address, step 522. POST Stage II then adjusts the value obtained as the last block address to account for the size of the system partition, step 524. This is done by subtracting from the physical last block address of the fixed disk 62 the amount of blocks in the system partition. POST Stage II saves the adjusted value as the logical last block address, step 526. By doing so, POST Stage II provides BIOS a mechanism to boot from the system partition instead of the beginning of the fixed disk partition. Reference is made to FIG. 13 for a more detailed discussion of the above.

Proceeding further, with respect to FIG. 11, POST Stage II examines the current contents of the POST Path Flag, step 528. The POST Path Flag is one mechanism used by POST to keep track of the type of path through POST. For example, an initial power on path versus a warm reboot path. A warm reboot is typically enabled by a Ctrl-Alt-Del keystroke sequence. If the current value of the POST Path Flag indicates override system partition boot procedures, POST Stage II sets the System Partition Boot Flag to false, indicating not to boot the system partition, step 530. POST Stage II then protects the system partition by instructing BIOS to activate the protection means on the boot fixed disk based on the value calculated in step 526, step 540. That is, the fence is set to address pointer calculated in step 526. Thus, the system partition is protected to prevent inadvertent destruction. Afterwards, POST Stage II invokes the Bootstrap Loader, INT 19H, to initiate operating system boot, step 542.

Referring back to step 528, if the POST Path Flag does not indicate an override of the system partition boot sequence, POST Stage II checks to see if the user has entered the keystroke sequence Ctrl-Alt-Ins. The keystroke sequence can be entered by the user shortly after entering POST Stage II or during the System Partition Boot Key Sequence Detection Window which is opened during steps 506 through 516. When the unique keystroke sequence is entered, a keystroke-sequence flag is set indicating keystroke activation. The Ctrl-Alt-Ins keystroke instruction invokes the booting of the system reference diskette image. POST Stage II checks the keystroke sequence flag to see if the keystroke sequence was detected, step 536. This sequence permits a user to force a bootup procedure from the system partition. If not, POST Stage II checks if POST detected any errors, step 534. If there are no errors, POST Stage II sets another flag indicating not to boot the system partition (flag set to false), step 530. POST Stage II now protects the system partition by instructing BIOS to activate the protection means, (step 540), followed by invoking the Bootstrap Loader, step 542.

Referring back to step 534, if POST Stage II detects any errors during its execution, it sets the System Partition Boot Flag to true, step 538. POST Stage II then protects the system partition by instructing BIOS to activate the protection means as shown in step 540. Afterwards, POST Stage II invokes the Bootstrap Loader 542 to initiate the operating system boot.

Referring back to step 536, if POST Stage II detects the user entered keystroke sequence of Ctrl-Alt-Ins, it sets the System Partition Boot Flag to true, indicating boot the system partition, step 538. POST Stage II then protects the system partition by instructing BIOS to activate the protection means as shown in step 540; followed by invoking the Bootstrap Loader, step 542.

At this point, POST Stage II has established if either a normal boot sequence (System Partition Boot Flag is set to false) or a boot of the system reference diskette image in the system partition (System Partition Boot Flag is set to true) is to occur. This eliminates the need for the user to separately insert a reference system diskette in the system to activate certain initialization and setup programs. Also, POST Stage II has established the beginning of the system partition as though it is a logical bootable partition and has activated the protection means to prevent access to the system partition by a program not considered to be trusted. A logical bootable partition appears to POST Stage II as the first partition on the disk and is therefore bootable. POST Stage II now invokes the Bootstrap Loader.

The Bootstrap Loader is used to select the appropriate boot device and read in the boot record from the active partition. The priority of the boot drives are the first diskette drive followed by the first fixed disk, such as the boot fixed disk. However, the priority of the default boot device sequence can be changed by using a utility on the system reference diskette or system reference diskette image in the system partition. The Bootstrap Loader then turns control over to the executable code in the boot record. This in turn boots the desired operating system or control program.

Figure 12:
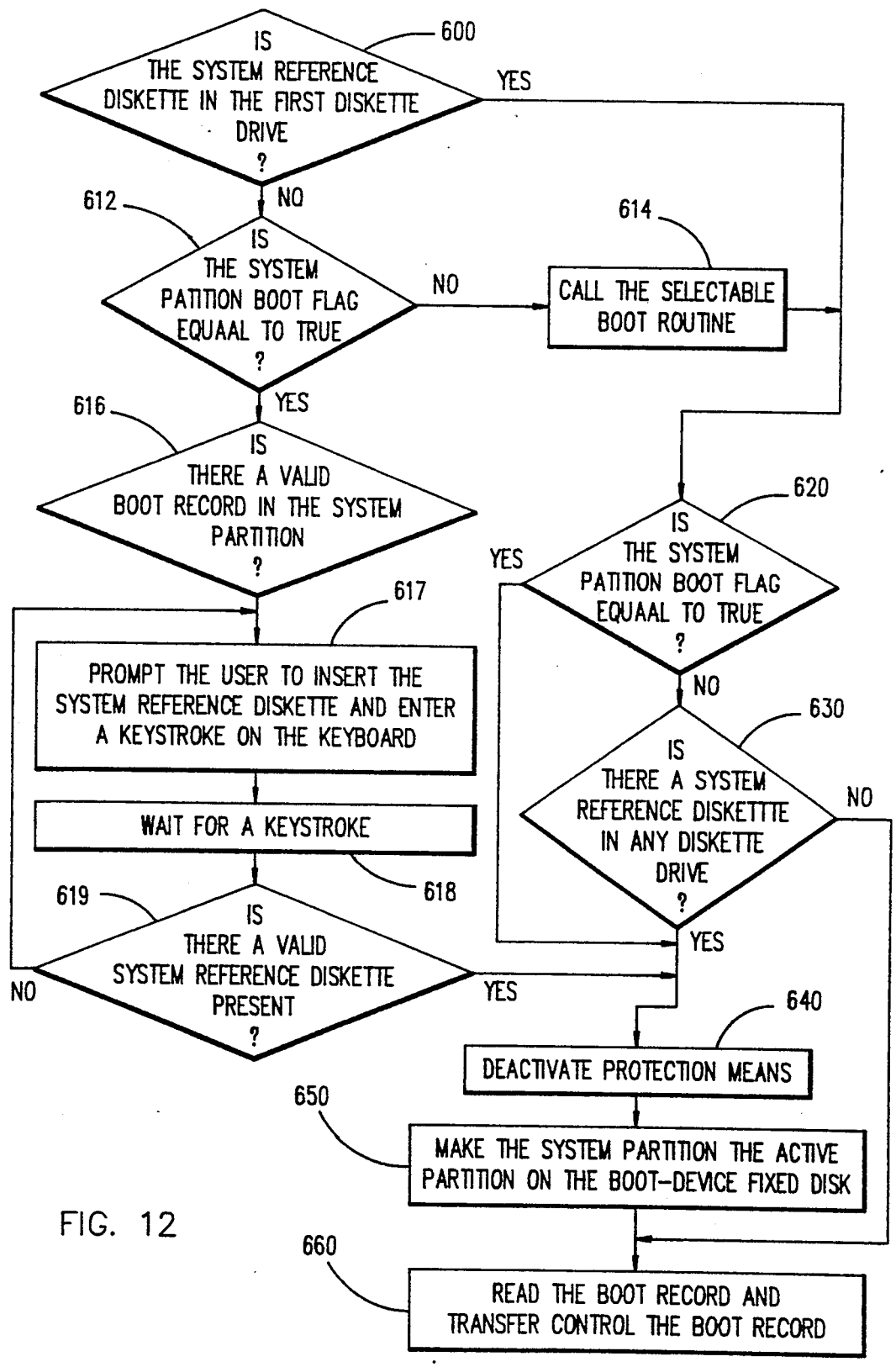
FIG. 12 is a flow diagram showing the Bootstrap Loader booting the correct media including the system reference diskette image from a direct access storage device.

Continuing the discussion with respect with FIG. 12, there is shown a flowchart describing the logic flow inside the Bootstrap Loader, INT 19H. To begin, the Bootstrap Loader checks for the actual presence of the system reference diskette in the first diskette drive, step 600. The presence of a system reference diskette in the first diskette drive overrides all other reference diskettes. In other words, invoking the system reference diskette overrides the system reference diskette image in the system partition or a direct request by the user to boot the operating system if POST errors are detected. Next, the System Partition Boot Flag is checked, step 620. Since the system reference diskette is present the System Partition Boot Flag is false.

Being that the System Partition Boot Flag is false, the Bootstrap Loader determines if a Reference Diskette Boot is required, step 630. Since a system reference diskette is present in the first diskette drive, the Bootstrap Loader first instructs BIOS to deactivate the protection means for the system partition, step 640. Then the Bootstrap Loader establishes the system partition as the origin of the boot fixed disk by using the value calculated in step 526 as the logical starting block address, step 650. The system partition is now unprotected. The Bootstrap Loader then fetches the boot record from the system reference diskette and passes control to it, step 660. The boot record then boots up the system reference diskette. For example, a user may be adding a new feature I/O adapter to the system and wants to install its adapter description file in the system partition.

Referring back to step 600, if no system reference diskette is present in the first diskette drive, the Bootstrap Loader checks the System Partition Boot Flag, step 612. If the flag indicates an operating system boot, the Boot Strap Loader transfers control to the selectable boot routine, step 614. The selectable boot routine then decides the physical device to boot from and proceeds to step 620.

The System Partition Boot Flag is then accessed to determine if it is set, step 620. If a system partition boot is not requested, the Bootstrap Loader determines if a system reference diskette boot is required, step 630. For instance, a system reference diskette may be in a bootable diskette drive other than the first physical diskette drive. If no system reference diskette is present, the Bootstrap Loader fetches the operating system boot record and passes control to it, step 660. The system partition remains protected and the BIOS will access another partition, namely the operating system partition on the boot fixed disk.

Referring back to step 630, if a system reference diskette boot is required, the Bootstrap Loader instructs BIOS to deactivate the protection means for the system partition and to establish the system partition as the origin of the boot fixed disk by using the value calculated in step 526 as the logical starting block address, step 650. The Bootstrap Loader fetches the boot record from the reference diskette (in this case, a system reference diskette is present) and boots up the system reference diskette, step 660. The system partition is unprotected and is now the active partition on the fixed disk. This is done to allow access by the reference diskette. As previously explained, a user may be adding a new feature I/O adapter to the system and wants to install its adapter description file in the system partition.

Referring back to step 620, if the System Partition Boot Flag is true, the Bootstrap Loader instructs BIOS to deactivate the protection means for the system partition step 640 and establish the system partition as the origin of the boot fixed disk by using the value calculated in step 526 as the logical starting block address, step 650. The Bootstrap Loader then fetches the boot record from the system reference diskette image in the system partition and boots up the system reference diskette image, step 660. The system partition is unprotected and is now the active partition on the boot fixed disk.

Referring back to step 612, if the System Partition Boot Flag indicates a system partition boot, the Bootstrap Loader checks for a valid boot record on the system partition, step 616. This step includes validating that the system partition is a full system partition; the boot record signature is valid; and a system reference diskette signature is present. If valid, the Bootstrap Loader queries the System Partition Boot Flag, step 620. Since it is true, the Bootstrap Loader instructs BIOS to deactivate the protection means for the system partition and establish the system partition as the origin of the boot fixed disk by using the value calculated in step 526 as the logical starting block address, steps 640 and 650. The Bootstrap Loader fetches the boot record from the system partition and boots up the system reference diskette image, step 660. The system partition is unprotected and is now the active partition on the boot fixed disk.

Referring back to step 616, if a valid boot record is not present, the Bootstrap Loader prompts the user to insert a system reference diskette in a diskette drive and press any key on the keyboard, step 617. The Bootstrap Loader then waits for the key to be entered, step 618. Once entered, the Bootstrap Loader checks that a valid system reference diskette is present, step 619. If not, the Bootstrap Loader repeats the process starting at step 617.

Referring back to step 619, if the Bootstrap Loader finds a valid system reference diskette, it instructs BIOS to deactivate the protection means for the system partition and establish the system partition as the origin of the boot fixed disk by using the value calculated in step 526 as the logical starting block address steps 640 and 650. The system partition is now unprotected, the Bootstrap Loader fetches the boot record from the system reference diskette and passes control to it, step 660. The boot record boots up the system reference diskette.

FIG. 13 shows the BIOS modification required to support booting of the system reference diskette image from the system partition of the boot fixed disk or to allow access to the image when a system reference diskette is booted. When BIOS receives a request to perform a data transfer operation it determines if this is the boot fixed disk as shown in step 700. The boot fixed disk is the first physical fixed disk on the fixed disk adapter. If the fixed disk is not the boot fixed disk, BIOS performs the requested operation, step 730.

Referring back to step 700, if the fixed disk is the boot fixed disk, BIOS checks to see if the System Partition Boot Flag is true or a system reference diskette is being booted, step 710. If neither is true, BIOS performs the requested operation, step 730.

Referring back to step 710, if the System Partition Boot Flag is true or a system reference diskette is being booted, the system partition block address calculated in step 926 is added to the requested block address, after converted from the user supplied cylinder, head and sector parameters provided with the request for a fixed disk data transfer function, step 720. This makes the system partition appear as the first block on the fixed disk. Thus the system partition appears to be the active partition on the boot fixed disk. Afterwards, BIOS performs the requested operation, step 730.

Thus, there has been shown a method and apparatus for booting the system reference diskette image from the system partition from a mass storage device, such as a fixed disk drive. The system partition is provided by protecting an area on the disk drive. The system partition is made bootable by storing the starting address of system partition on the disk drive and indicating to BIOS to use this as the fixed disk origin when a boot of the system reference diskette image is requested or required. By providing this capability, the system reference diskette utilities are automatically available any time the configuration is changed, a system utility is desired or an error is encountered during the execution of POST. Thus enhancing the usability of the system.

While the invention has been illustrated in connection with a preferred embodiment, it should be understood that many variations will occur to those of ordinary skill in the art, and that the scope of the invention is defined only by the claims appended hereto and equivalent.

We claim:

1. An apparatus for accessing system utilities in a personal computer system, the personal computer system having a system processor for executing an operating system, a read only memory, and a random access memory, said apparatus comprising:
   a direct access storage device;
   a portion of BIOS being included in the direct access storage device, said portion of BIOS being loaded into random access memory to boot the operating system; and
   a portion of system utilities included in the direct access storage device, said system utilities being automatically executed upon detecting an error condition said system utilities including a program for modifying the configuration of the system.

2. The apparatus of claim 1, wherein the direct access storage device comprises a fixed disk.

3. An apparatus for accessing a system utility program in a personal computer system, the personal computer system having a system processor, a read only memory, a main memory, and at least one direct access storage device capable of storing a plurality of data records, said apparatus comprising:
   a first program being included in the read only memory, said first program initializing the system processor;
   a loading means for loading data records from the direct access storage device into main memory, said loading means being read from the direct access storage device into main memory by said first program, wherein said first program activates said loading means;
   a main memory resident program image being stored in the direct access storage device, said main memory resident program image being read from the direct access storage device into main memory by said loading means to produce a main memory resident program; and
   a system utility program image being stored in the direct access storage device, said system utility program being read automatically from the direct access storage device into main memory upon said main memory resident program detecting an error in the system, said system utility program including a program for modifying the configuration of the system or a program for diagnosing the error in the system.

4. An apparatus for accessing system utilities in a personal computer system, the personal computer system having a system processor for executing an operating system, a read only memory, and a random access memory, said apparatus comprising:
   a direct access storage device;
   a portion of BIOS being included in the direct access storage device, said portion of BIOS being loaded into random access memory to boot the operating system; and
   a portion of system utilities included in the direct access storage device, said system utilities being executed upon detecting activation of an indicator, said system utilities including a program for modifying the configuration of the system or a program for diagnosing the error in the system.

5. The apparatus of claim 4, wherein the direct access storage device comprises a fixed disk.

6. The apparatus of claim 4, wherein said indicator is set by a user in response to said computer system activating a visual display.

7. The apparatus of claim 6, wherein said visual display comprises moving a cursor to the upper right corner of a screen.

8. The apparatus of claim 4, wherein said visual display is activated for a predetermined period.

9. An apparatus for accessing system utilities in a personal computer system, the personal computer system having a system processor for executing an operating system, a read only memory, and a random access memory, said apparatus comprising:
   a direct access storage device;
   a portion of BIOS being included in the direct access storage device, said portion of BIOS being loaded into random access memory to boot the operating system; and
   a portion of system utilities included in the direct access storage device, said system utilities being automatically executed upon detecting an error condition, said system utilities including a program for diagnosing the cause of the error condition.

10. The apparatus of claim 9 wherein the direct access storage device comprises a fixed disk.

* * * * *